US006099146A

United States Patent [19]

Imamura et al.

[11] Patent Number: 6,099,146

[45] Date of Patent: Aug. 8, 2000

[54] ILLUMINATING OPTICAL SYSTEM FOR CUTTING INFRARED LIGHT BY RELIEF TYPE OPTICAL ELEMENT

[75] Inventors: Ayami Imamura; Hitoshi Ohashi, both of Hachioji, Japan

[73] Assignee: Olympus Optical Company, Ltd., Tokyo, Japan

[21] Appl. No.: 09/017,796

[22] Filed: Feb. 3, 1998

[30] Foreign Application Priority Data

Feb. 4, 1997 [JP] Japan ........ 9-021247

[51] Int. Cl.[7] ........ F21V 9/04

[52] U.S. Cl. ........ 362/293; 362/257; 362/311; 362/317; 362/326; 359/558; 359/566; 359/569

[58] Field of Search ........ 362/351, 293, 362/311, 317, 326, 339; 313/113, 110; 359/350, 569, 558, 566, 568, 571, 573

[56] References Cited

U.S. PATENT DOCUMENTS 3,463,914 8/1969 Lutter ........ 362/293

5,523,815 6/1996 Tamura ........ 354/233

OTHER PUBLICATIONS

Mark's Standard Handbook for Mechanical Engineers, tenth edition, 1996.

*Primary Examiner*—Sandra O'Shea
*Assistant Examiner*—Ismael Negron
*Attorney, Agent, or Firm*—Stevens, Davis, Miller & Mosher, L.L.P.

[57] ABSTRACT

An illumination optical system for cutting infrared light by a relief type optical element includes a light source and a relief type diffraction optical element having a rectangular sectional-shaped grating having an equal area of land and groove areas so that primarily zero order light can be used for illumination while higher order and infrared light may be filtered out. A relief pattern has characteristics such that a ratio β of a width of a plurality of respective concave portions to a pitch of adjacent convex portions is in a range of $0.34 \leqq \beta \leqq 0.66$ and a groove depth d is in a range of $0.85\ d_0 \leqq d \leqq 1.09\ d_0$. Excessive heat from infrared light and higher order light may be eliminated without the use of an infrared cutter.

22 Claims, 16 Drawing Sheets

FIG_1a
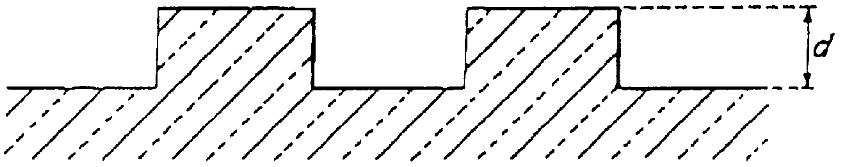
FIG_1b
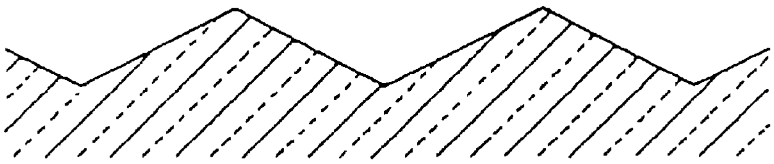
FIG_1c
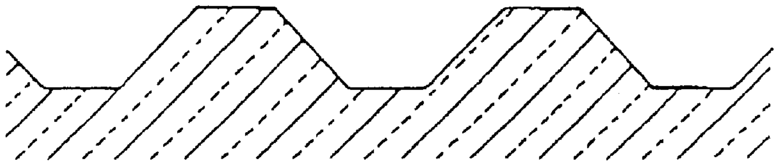
FIG_1d
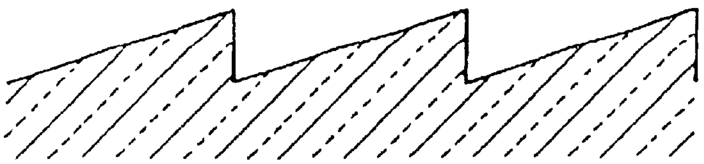

FIG_4
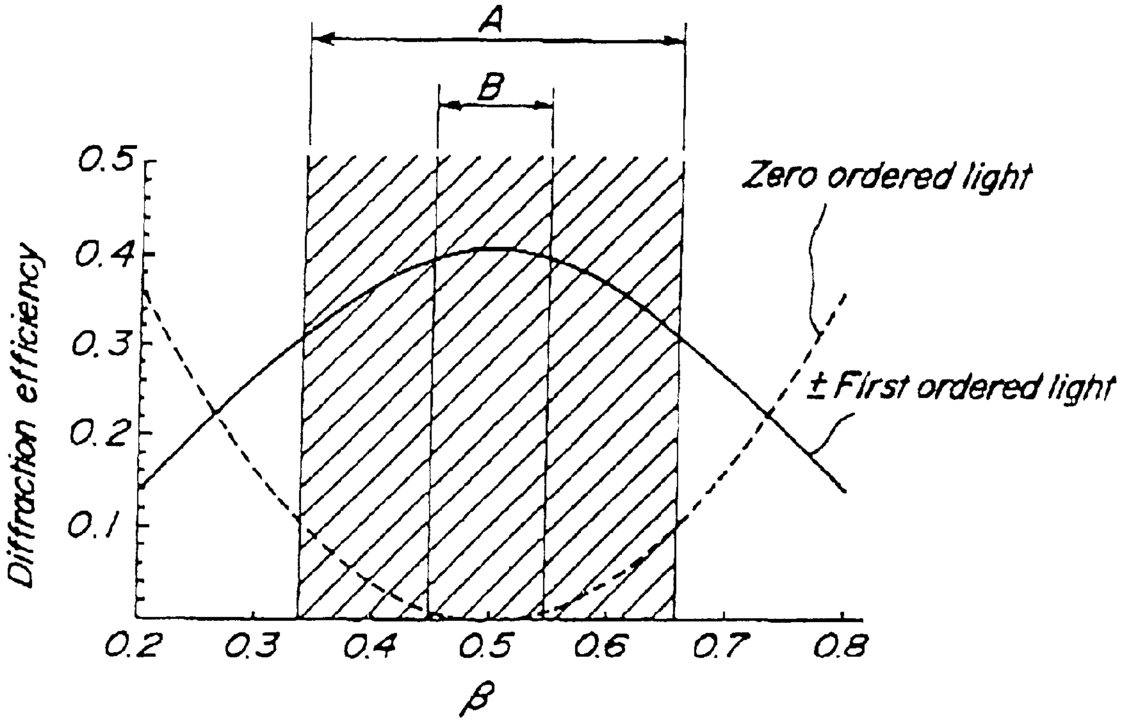

FIG_5
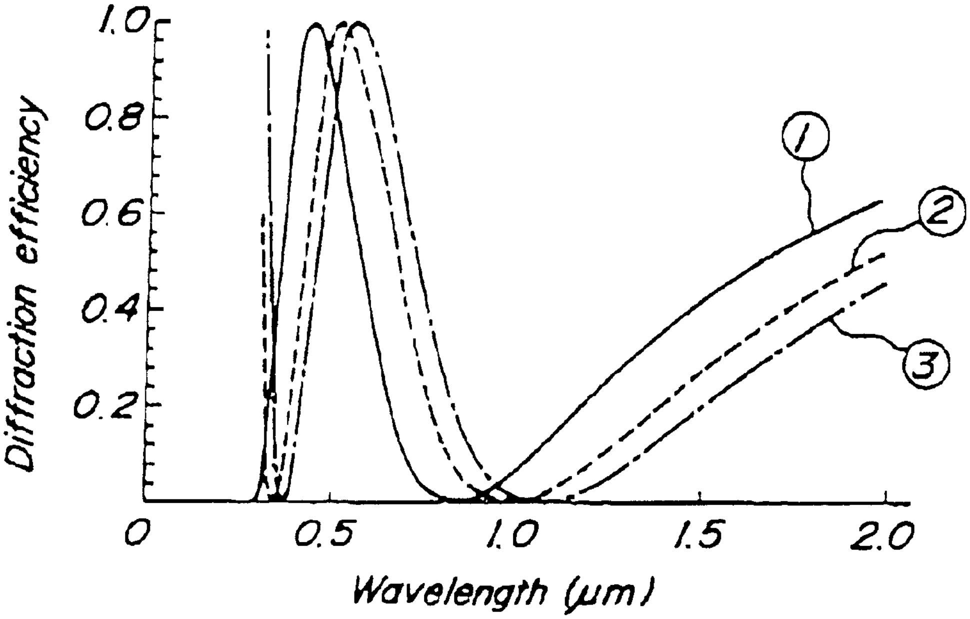
FIG_6
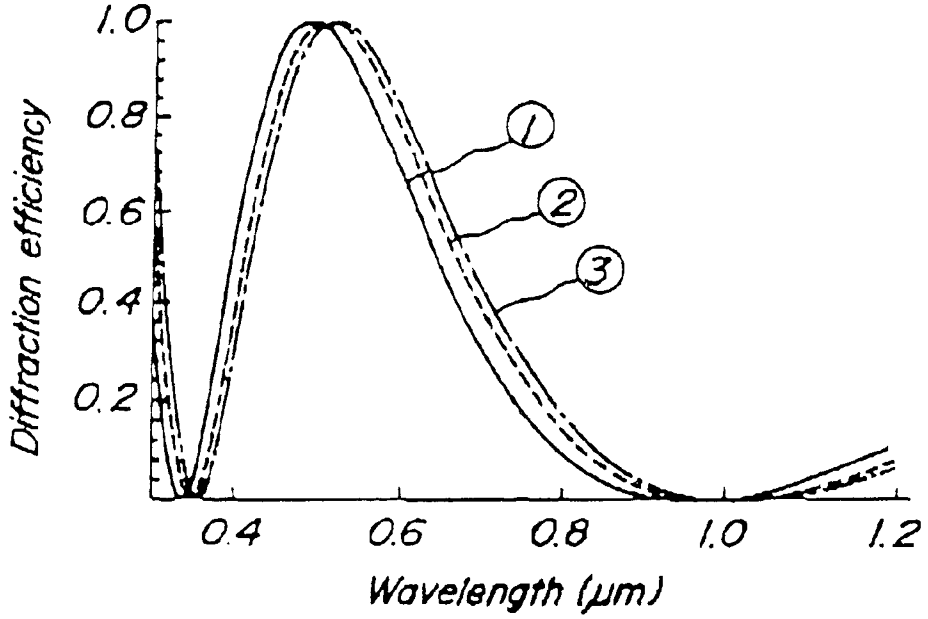

FIG_7a
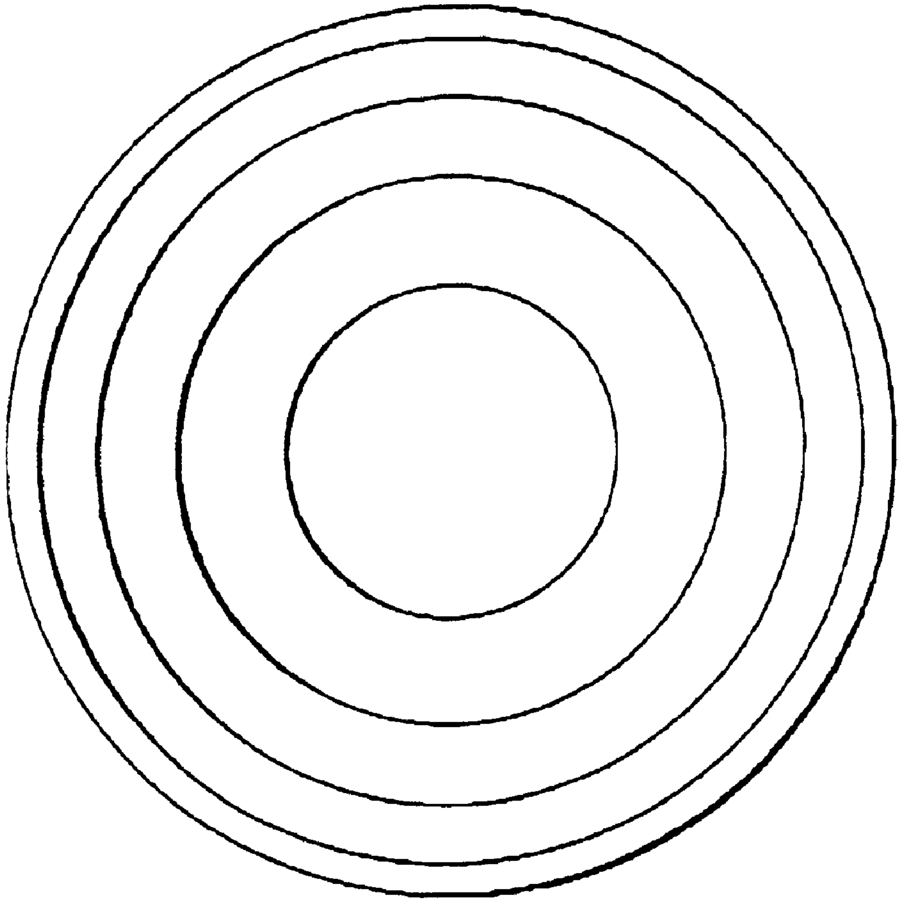
FIG_7b
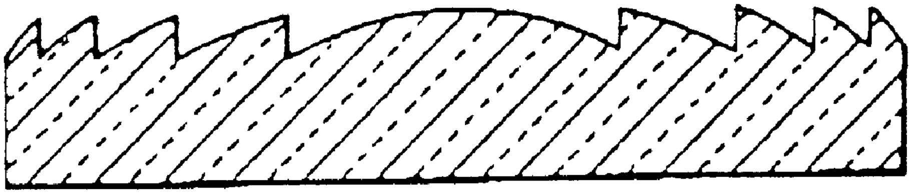

FIG_13a
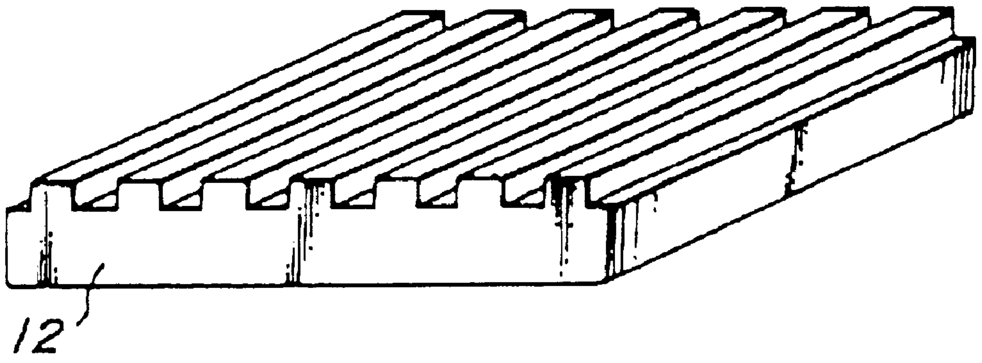
FIG_13b
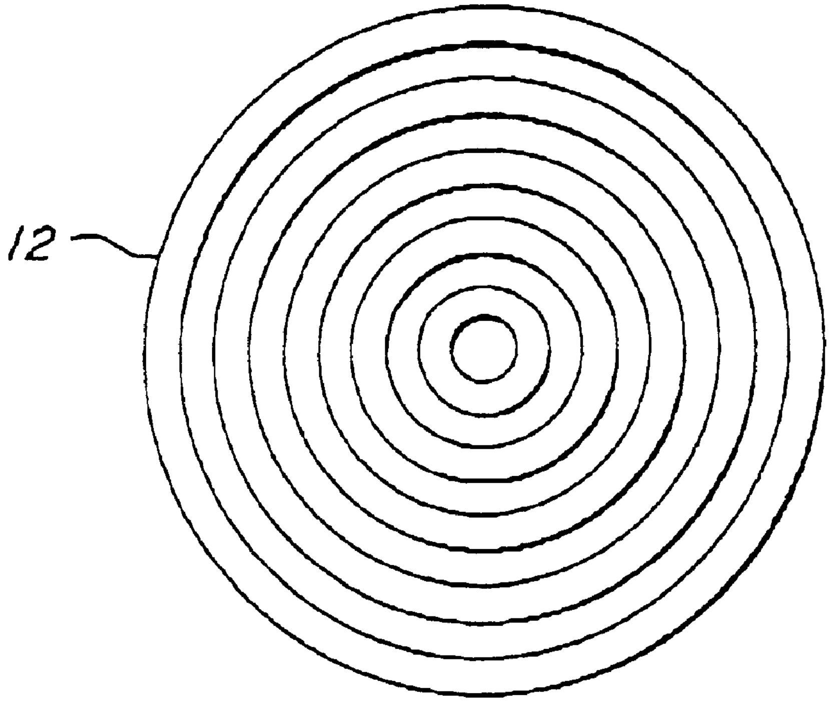

FIG_14a
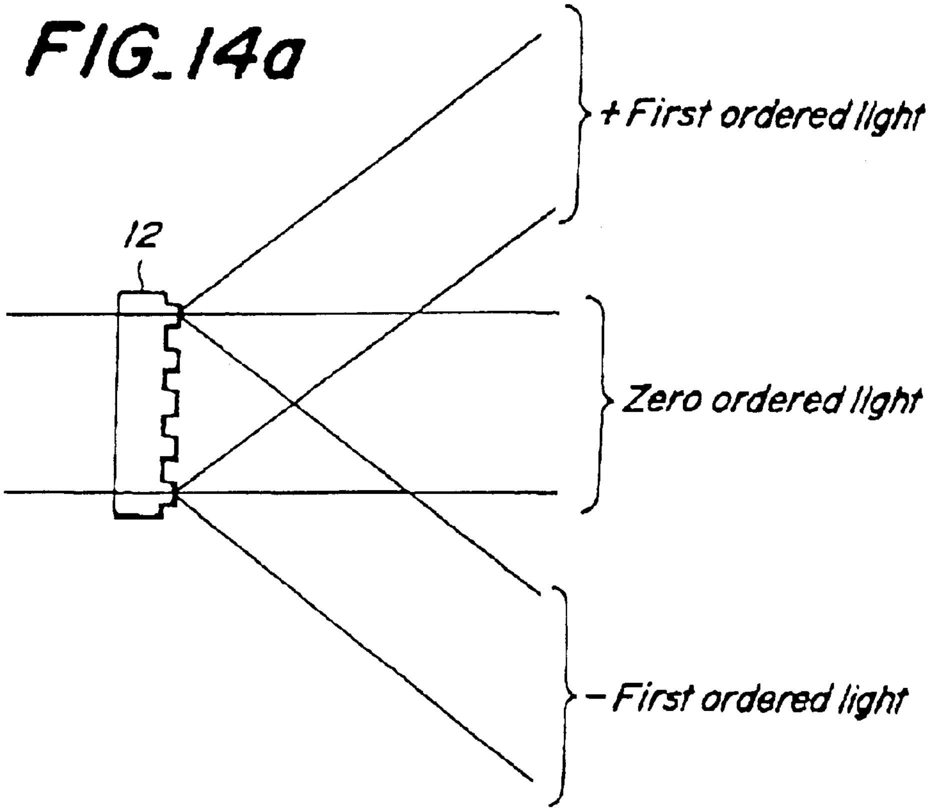
FIG_14b
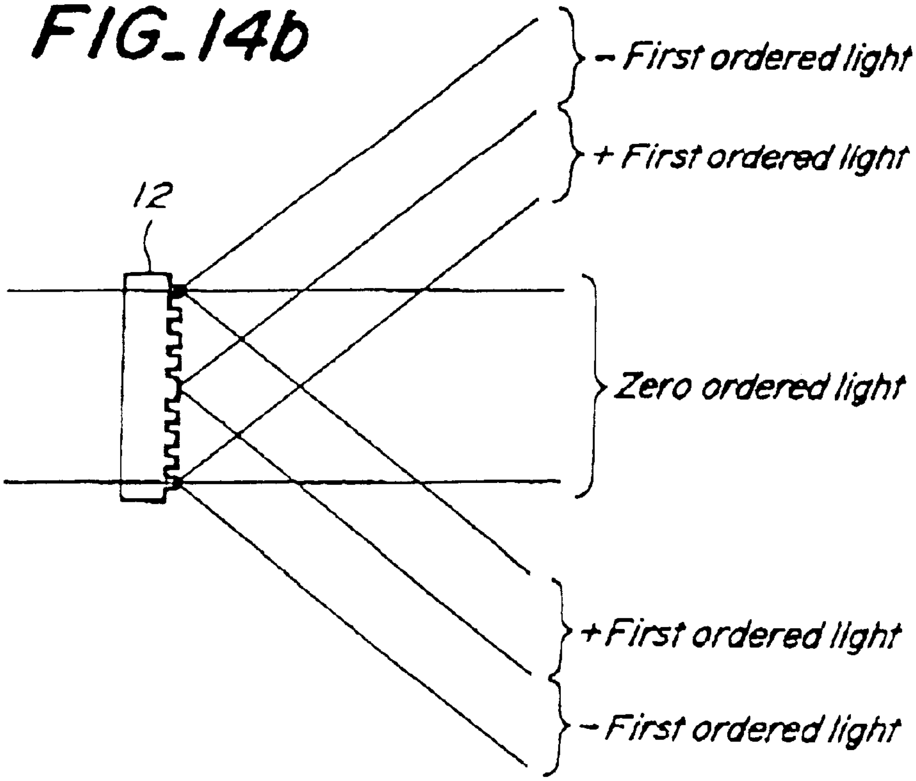

FIG_15
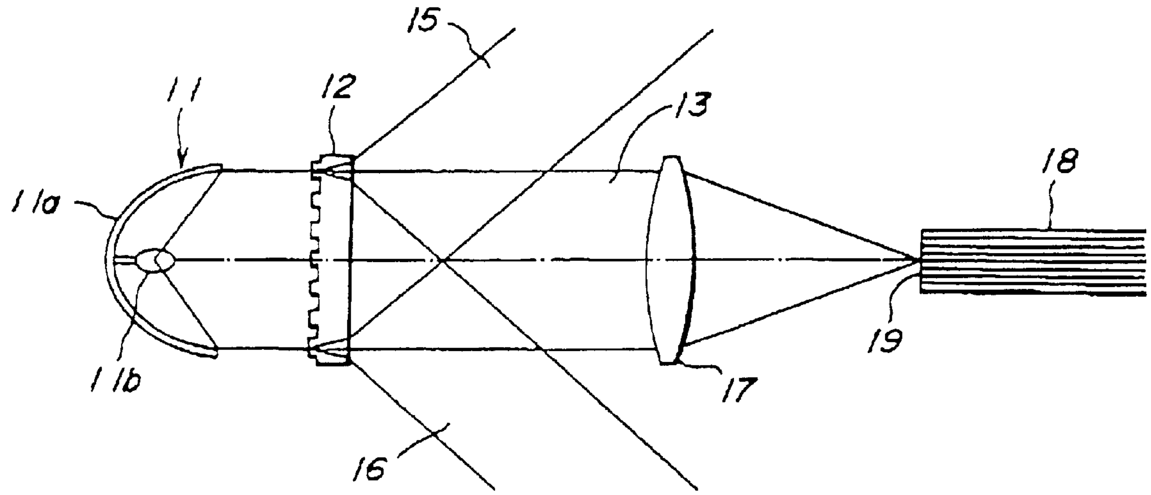
FIG_16

FIG_18
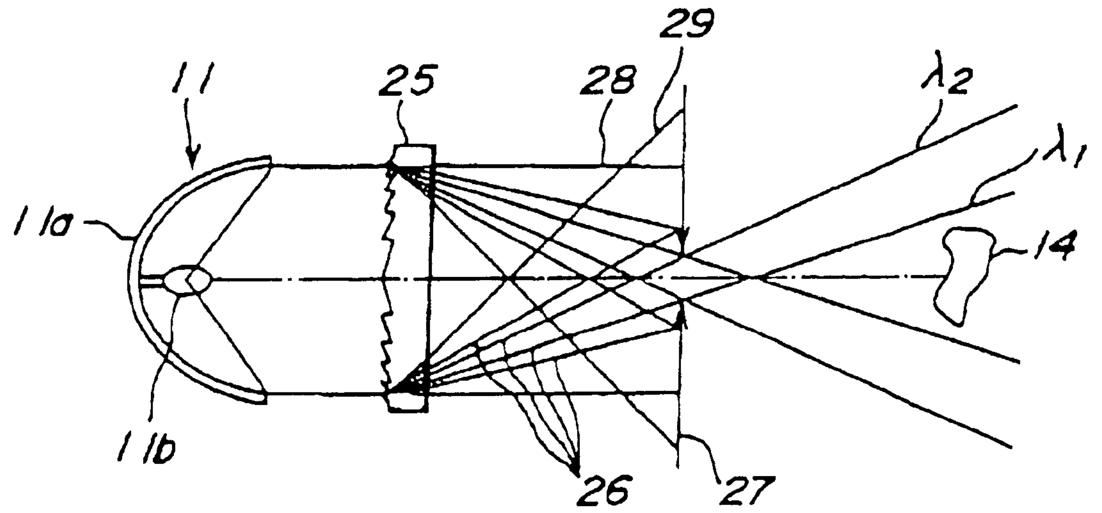
FIG_19
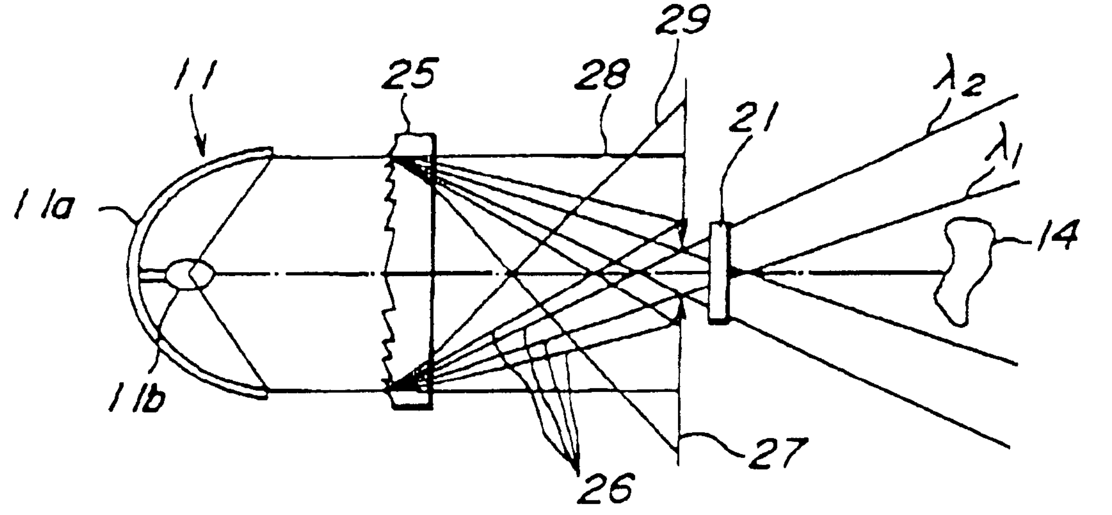

FIG_20
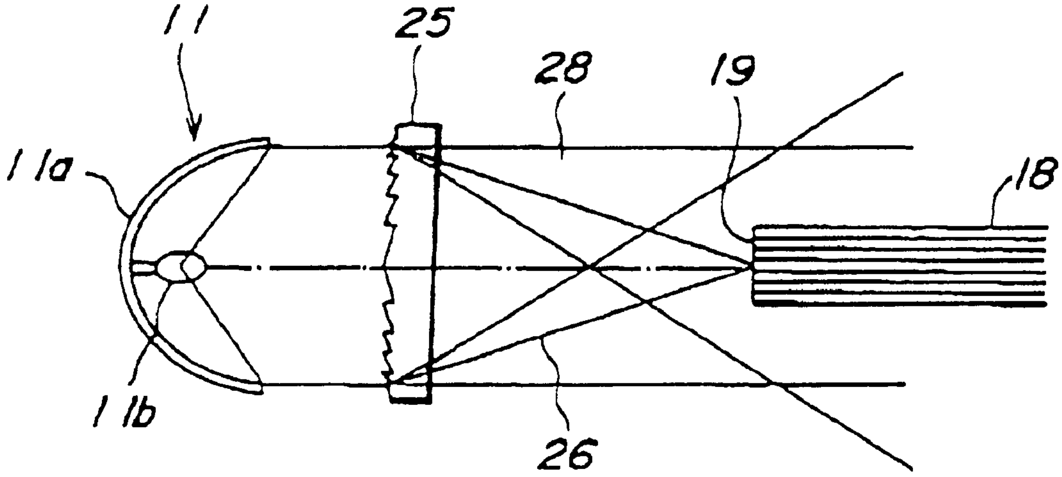
FIG_21
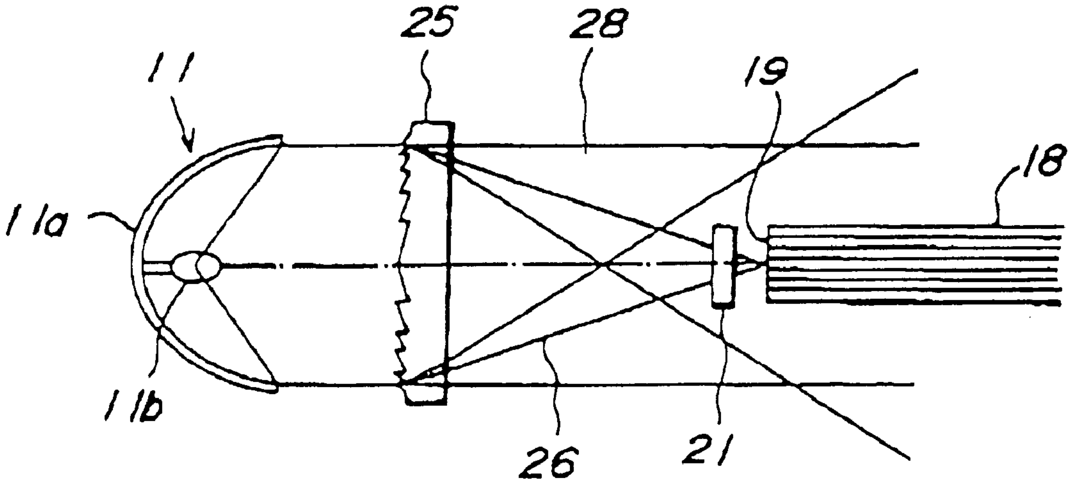

ILLUMINATING OPTICAL SYSTEM FOR CUTTING INFRARED LIGHT BY RELIEF TYPE OPTICAL ELEMENT

BACKGROUND OF THE INVENTION

1. Field of the Invention

The present invention relates to an illuminating optical system for use in an optical source for emitting white light including radiation components of visible range and infrared range.

2. Related Art Statement

In an optical machinery apparatus, for example, an endoscope or a microscope, a xenon lamp, a halogen lamp, and a metal halide lamp, or the like, are widely used as a light source. These light sources generate ultraviolet light and infrared light in addition to visible light. For example, if a viewing subject absorbs infrared light, generally, an infrared cutting filter is, (comprising an infrared absorption filter and an infrared reflection filter) inserted into an optical filter, so as to prevent the viewing subject from being heated by the infrared light.

An example of such an optical apparatusis disclosed in Japanese Utility Model Application Laid-Opened No. 51,411/91, wherein the white light emitted from the xenon lamp is incident on the infrared absorption filter and infrared reflection filter, successively; the radiation components of the infrared range which are included in the white light are reflected and absorbed to remove the infrared light from the white light. The light flux is transmitted successively to the infrared reflection filter and the infrared absorbing filter where it is condensed by the condenser lens, and the condensed light flux is transmitted to the object point through the light guide.

The above infrared absorbing filter absorbs the light of infrared range from the incident light, and transmits the wavelengths of light which are shorter than the infrared range so that instead of absorption, the infrared light is removed. Therefore, if the white light including the infrared light is incident on the infrared absorbing filter, only the infrared light is removed, so that heating of a sample can be prevented if light is illuminated on a sample. Because the infrared absorbing filter itself absorbs the infrared light, it becomes heated. Therefore, the problem arises that the heated amount becomes large and the infrared absorbing filter suffers from clacking and melting in cases of high intensity incidents of light, and/or prolonged illumination of the light.

Meanwhile, the infrared reflecting filter is formed as an interference filter consisting of generally multi-layer film, which is expensive to manufacture. Moreover, the amount of infrared light removed by reflection, as compared with the energy of light being absorbed by the infrared absorbing filter, is small. Even if the energy of light absorbed is small, a problem arises in that the infrared reflection filter becomes deteriorated during the absorption of light, causing a heating of the filter over a long period of time.

SUMMARY OF THE INVENTION

It is an object of the present invention to eliminate the above described disadvantages of the conventional illumination optical system.

It is another object of the present invention to provide an illumination optical system capable of eliminating infrared light effectively, without using an infrared cutting filter.

To this end, one aspect of the present invention provides an illumination optical system comprising:

a light source for emitting white light including at least components of visible and infrared ranges; and a relief type diffracting optical element (e.g. laminar or lamellar grating) for diffracting light flux of the white light;

said relief type diffracting optical element having a grating with a rectangular sectional shape at an equidistant grating distance, in such a manner that a zero order light can be used as illumination light among a plurality of light diffracted emitted from said relief type diffracting optical element.

In another embodiment of the present invention, there is provided an illumination optical system comprising:

a light source for emitting white light including at least a component of visible and infrared ranges;

a relief type diffracting lens for diffracting light flux of the white light;

a diaphragm arranged at the image point side than the diffracting lens;

the diffracting lens having sectional shape of a blazed grating form;

the diaphragm being arranged at a position of light axis direction in such a manner that radius of light flux of wavelength λ1 and wavelength λ2 of diffracted ordered light of the diffracting lens which is used as an illumination light, becomes almost equal to each other, and the diaphragm has almost a radius equal to the radius of light flux, wherein the wavelength $\lambda_1$ and the wavelength $\lambda_2$ are a wavelength in following range, respectively.

$$0.35\ \mu m \leqq \lambda_1 \leqq 0.45\ \mu m$$

$$0.65\ \mu m \leqq \lambda_2 \leqq 0.8\ \mu m$$

In a further aspect of the present invention, there is provided an illumination optical system comprising:

a light source for emitting white light including at least a component of visible and infrared ranges;

a light guide to transmit light flux of the white light to objective point;

the system having a sectional shape being a relief type diffracting lens in a blazed form which is arranged in a light path between the light source and an end face of the light guide at its incident side.

BRIEF DESCRIPTION OF THE DRAWINGS

FIGS. 1*a,* 1*b,* 1*c* and 1*d* are sectional views showing four embodiments of relief type diffraction optical elements;

FIG. 4 is an explanatory view showing one embodiment of β dependency of diffraction efficiency of ±first ordered light and zero ordered light in the wavelength in such a manner that the diffraction efficiency of ± first ordered light becomes maximum in the relief type diffraction optical element having a construction of sectional view shown in FIG. 1*a;*

FIG. 5 is an explanatory view showing one embodiment of wavelength dependency of diffraction efficiency of zero ordered light when the depth of the concave portion are 0.85 $d_0$, 1 $d_0$ and 1.09 $d_0$, respectively, in the relief type diffraction optical element having a construction of sectional view shown in FIG. 1*a;*

FIG. 6 is an explanatory view showing one embodiment of wavelength dependency of diffraction efficiency of zero ordered light when the depth of the concave portion are 0.96 $d_0$, 1 $d_0$ and 1.02 $d_0$, respectively, in the relief type diffraction optical element having a construction of sectional view shown in FIG. 1*a;*

FIGS. 7*a* and 7*b* are a plan view and a sectional view showing one embodiment of the relief type diffraction lens;

FIGS. 13*a* and 13*b* are a perspective view and a plan view showing two embodiments of the illumination optical system according to the present invention;

FIGS. 14*a* and 14*b* are plan views explaining a diffraction operation in the diffraction optical element shown in FIGS. 13*a* and 13*b,* respectively;

FIG. 15 is a side view showing a modification of one embodiment shown in FIG. 12;

FIG. 16 is a sectional view explaining a radiation means for use in the present invention;

FIG. 18 is a side view showing second embodiment of an illumination optical system according to the present invention;

FIG. 19 is a side view showing the construction of the illumination optical system provided with the infrared cutting filter in FIG. 18;

FIG. 20 is a side view showing third embodiment of an illumination optical system according to the present invention;

FIG. 21 is a side view showing the construction of the illumination optical system provided with the infrared cutting filter in FIG. 20;

DETAILED EXPLANATION OF THE PREFERRED EMBODIMENT

Figure 2:
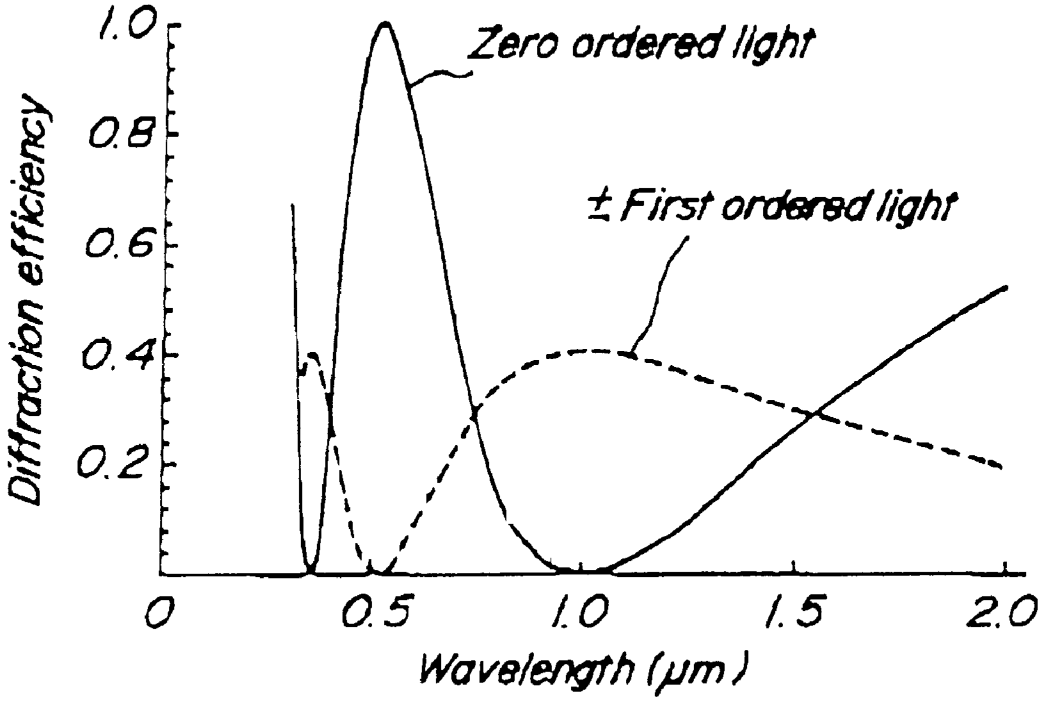
FIG. 2 is an explanatory view showing one embodiment of wavelength dependency of diffraction efficiency of zero ordered light and ± first ordered light in the relief type diffraction optical element having a construction of sectional view shown in FIG. 1*a;*

The drawings show various embodiments of an illumination optical system according to the present invention. Like parts are shown by corresponding reference characters throughout several views of the drawings.

According to an embodiment of the present invention, white light emitted from a light source is incident on a relief type diffraction optical element. Herein, "relief type diffraction optical element" means, as shown in FIGS. 1*a* to 1*d,* an element having a pattern of diffraction grating construction formed in the depth direction on a surface of the element, the pattern thereby diffracting the light. Such optical elements are sometimes referred to as "laminar" or "lamellar" in the art. In the present invention, as shown in FIG. 1*a,* a diffraction grating having a rectangular sectional shape and an equidistant grating distance between the rectangular sections is used as a diffraction optical element. Such a diffraction optical element has a nature in which a diffraction efficiency of +m order light is equal to that of −m order light. Also, a diffraction efficiency is different by a wavelength of incident light, and the diffraction order in which the diffraction efficiency becomes most high is also different by the wavelength of incident light. Moreover, the maximum value of diffraction efficiency of ±first order light is 40.5%, and becomes higher than that of the diffraction efficiency of ±first order light shown in FIGS. 1*b* and to 1*c.*

FIG. 2 shows one embodiment of wavelength dependency of diffraction efficiency of zero order light and ±first order light of the relief type diffraction optical element shown in FIG. 1*a*. Herein, the diffraction optical element is thin type and its surface reflection is not considered. Moreover, the depth d of the concave portion is a depth in such a manner that the diffraction efficiency of ±first order light becomes maximum at 1.0 $\mu$m of wavelength, and a ratio of width of convex portion and concave portion is 1:1. As is seen from FIG. 2, zero order light has high diffraction efficiency at visible range and has 100% diffraction efficiency at 0.5 $\mu$m of wavelength. On the contrary, ±first order light has low diffraction efficiency at visible range and has high diffraction efficiency at infrared range. That is, the diffraction efficiencies of +first order light and—order light are equal to each other, so that at 1.0 $\mu$m of wavelength, about 80% of incident light are refracted as +first order light or—first order light, and thus zero order light is not emitted. Therefore, the zero order light includes many light components of visible range, and includes small light components of infrared range, principally. On the contrary, ±first order lights include many light components of infrared range and includes small light components of visible range, principally.

In the present invention, the white light emitted from the light source is incident on the relief type diffraction optical element, so that the light components in the visible range of the white light are rectilinearly propagated as the zero order light and the light components in the infrared range are diffracted as the ±first order light, thereby using the zero order light as an illuminating light. By providing this type of construction, the zero order light includes many light components of a visible range and also includes small light components of an infrared range. The illumination light becomes substantially visible light. To permit illumination of the viewing subject at an objective point. On the contrary, ±first order light including many components of infrared range, and higher order diffraction lights, diffracting at larger angle than the ±first ordered lights, are out of optical path and do not illuminate the viewing subject.

In the relief type diffraction optical element, if the visible light of comparative short wavelength and the infrared light of comparative long wavelength from the light source are bent in a the different direction as different diffraction order light, and the zero order light including many light components of visible range and small light components of infrared range are used as an illumination light, then the ±first order light including many light components of infrared range can be out of the optical path and can be removed from the illumination light. Therefore, the infrared light can be removed on the optical path without utilizing a conventional infrared cutting filter. However, if the invention utilizes the infrared cutting filter when the infrared light is out of the optical path in the diffraction optical element, and the infrared cutting filter is positioned, the infrared light passing through the infrared cutting filter becomes remarkably decreased. Therefore, deterioration and the damage to the infrared cutting filter can be effectively prevented.

In one embodiment of the present invention, a light guide is provided for transmitting the light flux of the zero order light of the relief type diffraction optical element to the objective point.

Herein, the light guide is constructed by bundling a number of optical fibers, so that the guide has flexibility. Therefore, the optical axis of the light emitted from the light guide can be bent in a direction different from the optical axis of the incident light to the light guide, so that the light incident on the light guide can be emitted in a direction different from the propagating direction of the incident light at incident time. Moreover, if light flux with zero order light and other diffracted order light is completely divided, and light incident end of light guide is arranged at the position where only the zero order light is entered, only zero order light can be propagated to an object point.

In this way, if only zero order light among light diffracted with a relief type diffracting optical element is incident on the light guide, a subject to be viewed on the object point can be illuminated only by the visible light. The light guide has flexibility, even though the viewing subject is positioned at the place where the zero order light emitted from diffraction optical element is out of the optical axis. In addition, a shading object is positioned between the diffraction optical element and the viewing subject, and the viewing subject can be illuminated effectively by bending the light guide.

Furthermore, in another embodiment of the present invention, a ratio β of width of respective convex portions and pitch of an adjacent convex portion of the relief pattern of the above relief type diffracting optical element is made following range;

$$0.34 \leqq \beta \leqq 0.66,$$

and the depth of the concave portion is made following range;

$$0.85\ d_0 \leqq d \leqq 1.09\ d_0,$$

wherein d0 is the depth of the concave portion that diffraction efficiency of the zero ordered light has equal, diffraction efficiencies at wavelengths between 0.4 μm and 0.7 μm.

Figure 3:
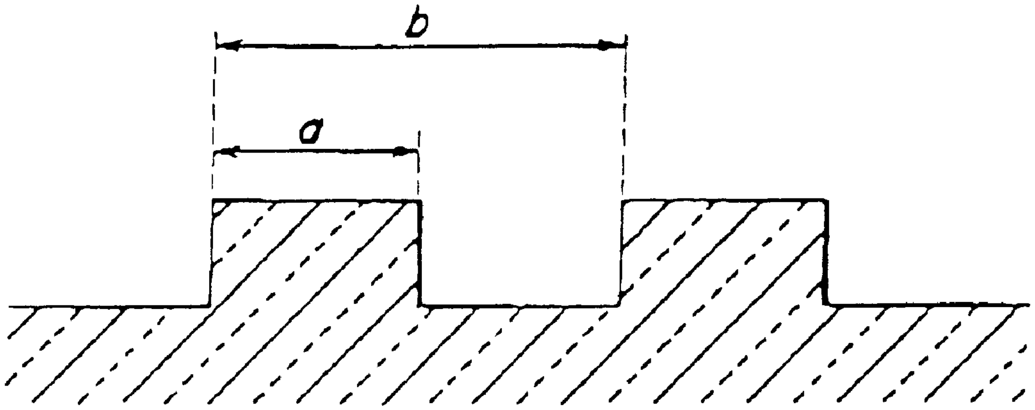
FIG. 3 is an explanatory view showing a ration β of the width of convex portion of relief pattern and pitch of the relief type diffraction optical element used in the present invention.

In this case, as shown in FIG. 3, the ratio β of the width of respective convex portion and the pitch of the adjacent convex portion is defined as following equation;

$$\beta = a/b,$$

wherein width of convex portion is a, and the pitch of convex portion is b.

FIG. 4 shows one embodiment of β dependency of the diffraction efficiency of the ±first order light and the zero order light at a wavelength such that the diffraction efficiency of ±first order light becomes maximum in the relief type diffraction optical element in the above relief type diffraction optical element. The above β of range is a shaded portion A (shown in FIG. 4) and in this range, the diffraction efficiency of ±first order light is high; the diffraction efficiency of zero order light is 10% or less, and ±first order light is off optical path, and is removed, as shown in FIG. 2. Even if the diffraction efficiency of ±first order light is high in the infrared range, most of the light components of the infrared range are diffracted and removed as ±first order light of the infrared range. On the contrary, the light components become less in the infrared range, particularly, near wavelength 1.0 μm, as the light components enter into the light guide as zero order light and reach the object point and illuminate the viewing subject.

The depth of the concave portion, when diffraction efficiency of zero order light in wavelength 0.4 μm and 0.7 μm becomes equal, is made 1 $d_0$; if the depth d of the concave portion of the diffraction optical element is established within the above range, the efficiency of the zero order light at the visible range can be made high. FIG. 5 shows a wavelength-dependency of diffraction efficiency of the zero order light in the case of the depth of concave portion being 0.85 $d_0$, 1 $d_0$ and 1.09 $d_0$, respectively. Herein, the diffraction optical element is made by quartz, and $d_0$ is 1.095 μm. Moreover, In FIG. 5, curves ①, ② and ③ show graphs in the case of the depth of concave portion being 0.85 $d_0$, 1 $d_0$ and 1.09 $d_0$, respectively. In this case, the diffraction optical element is made thin and its surface reflection is not considered. As is seen from FIG. 5, if the depth d of concave portion is in the above range, the diffraction efficiency of the zero ordered light becomes at least 10% or more in the range of wavelength 0.4 μm~0.7 μm. (20)

As previously discussed above, a ratio β between the width and the pitch of the convex portion of the diffraction optical element is in the range of $0.34 \leqq \beta \leqq 0.66$; then the diffraction efficiency of the zero order light becomes 10% or less in high wavelength range of ±first order light. Therefore, when the infrared light is removed by making the diffraction efficiency of the +first order light high in the infrared range, the infrared light for illuminating the viewing subject through the light guide as the zero ordered light can be slightly decreased. This slight decrease permits obtainment of a sufficient infrared light eliminating effect, practically, and thus obtainment of the illuminating light in which the infrared light is removed. As a result, the heat generated by absorption of infrared light in the optical element can be further reduced, thereby being able to suppress deterioration and damage of the element more effectively. Also, the depth of the concave portion is made $0.85\ d_0 \leqq d \leqq 1.09\ d_0$, so that the diffraction efficiency of the zero ordered light can be made high in the visual range of 0.4 μm–0.7 μm, thereby being able to obtain bright illuminating light by using the zero ordered light.

Furthermore, according to another embodiment of the present invention, the above ratio β is made between $0.45 \leqq \beta \leqq 0.55$, and the depth d of the concave portion is made between $0.96\ d_0 \leqq d \leqq 1.02\ d_0$.

In this case, the range β becomes the shaded portion B in FIG. 4. In this range β, the diffraction efficiency of ±first order light is particularly high and the diffraction efficiency of the zero order light is 1% or less, that is, particularly low. Therefore, as shown in FIG. 2, in the case of high diffraction efficiency of ±first order light in the infrared range, further more light components in the infrared range are diffracted and removed as a ±first order light. On the contrary, the light components at the infrared range, particularly near wavelength 1.0 μm, for illuminating the viewing subject, and which enters the light guide and reaches the object point, becomes further less.

If the depth of concave portion is set to the above range, the efficiency of zero ordered light can be increased at the visual range. FIG. 6 shows the wavelength dependency of diffraction efficiency of the zero ordered light in the case of the depth of concave portion being 0.96 $d_0$, 1 $d_0$ and 1.02 $d_0$, respectively. Herein, the diffraction optical element is made of quartz, and $d_0$ is 1.095 μm. In FIG. 6, curves ①, ② and ③ show graphs in the case of the depth of concave portion being 0.96 $d_0$, 1 $d_0$ and 1.02 $d_0$, respectively. In this case, the diffraction optical element is made thin and its surface reflection is not considered. As is seen from FIG. 6, if the depth d of concave portion is in the above range, the diffraction efficiency of the zero ordered light becomes at least 30% or more in the range of wavelength 0.4 μm~0.7 μm. Therefore, in the visual range of wavelength range 0.4 μm~0.7 μm utilized as an illuminating light, the zero order light utilized as an illuminating light, particularly includes more light components in the visual range.

In this way, if a ratio β between the width and the pitch of the convex portion of the diffraction optical element is in the following range; $0.45 \leqq \beta \leqq 0.55$, the diffraction efficiency of the zero order light becomes 10% or less, particularly low in high wavelength range of ±first order light. Therefore, when the infrared light is removed by making the diffraction efficiency of the ±first order light high in the infrared range, the infrared light for illuminating the viewing subject through the light guide as the zero order light can be less particularly. Therefore, to obtain the further sufficient infrared light eliminating effect, practically, and thus obtaining the illuminating light in which the infrared light is removed further effectively. As a result, the heat generated by absorption of infrared light in the optical element can be reduced with better effectively, thereby reducing the deterioration and damage of the element more effectively. Also, the depth of the concave portion is made $0.96 d_0 \leqq d \leqq 1.02\ d_0$, so that the diffraction efficiency of the zero order light can be made high particularly in the visual range of 0.4 μm~0.7 μm, thereby being able to obtain bright illuminating light by using the zero order light.

In an embodiment of the present invention, the white light emitted from the light source is diffracted by a relief type diffraction lens. Herein, the relief type diffraction lens means a kind of relief type diffraction optical element, and is disclosed in, for example, "Optics" 22, 1993, pp. 635–642 and pp. 730–737, K. Goto "Optical element utilizing diffraction". This relief type diffraction lens has a pattern of concentric circular shape, and is a diffraction type optical element having lens action. FIGS. 7*a* and 7*b* are plan view and a sectional view each showing one embodiment of diffraction lens of relief type, respectively. This diffraction lens diffracts the light by means of a concentric circular pattern having a diffraction construction formed on the surface in the depth direction and has a lens operation. Moreover, this diffraction lens is a relief type, so that it has different diffraction orders, in which the diffraction efficiency becomes most high by the wavelength of the incident light.

As described above, the diffraction lens provides a lens operation, so that the diffraction order lights, other than the zero order light, are condensed or diverged. Herein, supporting that the light curved in the condensed direction is positive order light, the focal length of the +first order light is most long, and the focal length becomes shorter as the order of the light becomes high, such as +second order light, +third order light, or the like. Moreover, all negative order lights are diverged, and the radius of light flux does not change in the zero order light, so that on the imaging surface of the +m order light (m=1, 2, 3, . . . ), +m order light is imaged. However, other ordered lights are not imaged and diverged. Therefore, if a diaphragm having a magnitude in such a manner that the light flux of the +m order light just transmits therethrough is positioned on the imaging surface of +m ordered light, all the +m order lights are transmitted through the diaphragm, but other diffraction order lights are shielded by the diaphragm, thereby passing only a part thereof.

Herein, in the present invention, the sectional shape of the diffraction lens is made blazed shape, as shown in FIG. 1*d*. The diffraction optical element having such a blazed shape has a property in which the diffraction efficiency of certain diffraction order light becomes 100% in certain wavelength. In other word, the diffraction order light of the blazed diffraction optical element, that is, the diffraction efficiency of +m ordered light becomes 100% at the wavelength λ, when a phase difference of the crest and valley of the blazed shape becomes integral multiples of 2 π, that is, the depth d of concave portion is obtained as following equation;

$$d = m\lambda / [n(\lambda) - n_0(\lambda)] \tag{1}$$

wherein m is integer, and is also diffraction order, n(λ) is a refractive index for the wavelength λof the medium in which the diffraction pattern of the diffraction optical element is formed, and $n_0(\lambda)$ is a refractive index for the wavelength λ of medium adjacent to the diffraction plane. Commonly, the diffraction optical element is placed in the air, so that hereinafter, supporting that the medium adjacent to the diffraction plane is made an air, and the refractive index for the wavelength λ of medium adjacent to the diffraction plane is $n_0(\lambda)$ 1. Therefore, the depth d of the concave portion in which the diffraction efficiency becomes 100%, is obtained as following equation;

$$d = m\lambda / [n(\lambda) - 1] \tag{2}$$

Figure 8:
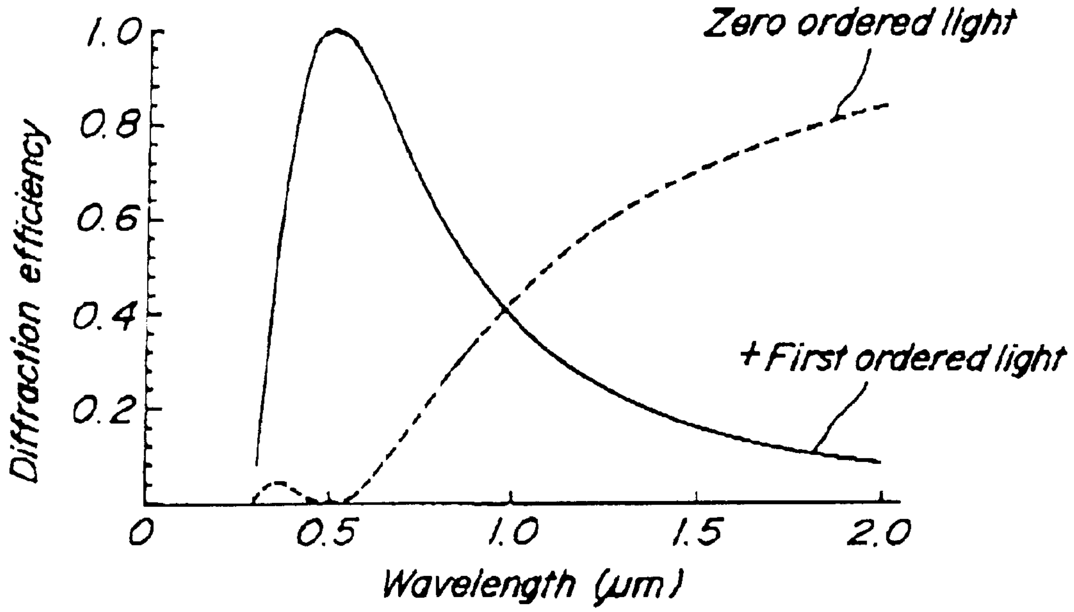
FIG. 8 is an explanatory view showing one embodiment of wavelength dependency of diffraction efficiency of zero ordered light and ±first ordered light in the relief type diffraction optical element shown in FIG. 7.

From the equation (2), if, for example, the diffraction lens is made of quartz, and the diffraction efficiency of the ±first order light is made 100% at wavelength 0.5 μm, the depth d thereof becomes d=1.08 μm. FIG. 8 shows the wavelength dependency of diffraction efficiency of the zero order light and +first order light, in this case, wherein the diffraction optical element is made thin and its surface reflection is not considered. As is seen from FIG. 8, the +first order light is in the visual range and its diffraction efficiency is high, as well as the zero order light is in the infrared range and its diffraction efficiency is high. That is, the +first order light includes a number of light components in the visual range and the zero order light includes a number of light components of the infrared range. Therefore, if only the +first order light is transmitted through a diaphragm to shield the zero order light and the other diffraction order light, the illuminating light comprising light components in the visual range, substantially can be obtained.

While, in an embodiment of the present invention, the diaphragm is positioned on the optical axis at image side rather than the diffraction lens. This position in the optical axis direction of the diaphragm is a position in which an optical flux radius of wavelengths $\lambda_1$ and $\lambda_2$ of the above range of diffraction ordered light utilize an illuminating light which is equal to each other, and the radius of its diaphragm is equal to the radius of its light flux. In this case, the diffraction light by the diffraction lens becomes bent greatly, the longer the wavelength is longer, so that if the white light is incident on the diffraction lens, the distance from the diffraction lens to the imaging point becomes short the longer the wavelength.

Figure 9:
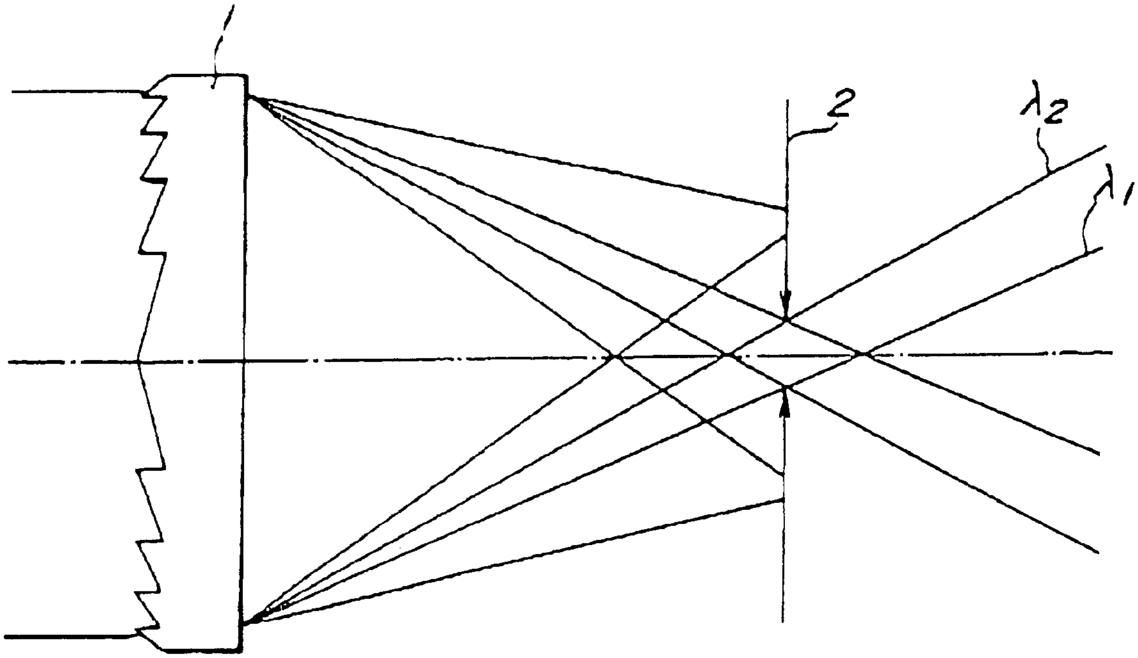
FIG. 9 is a side view showing one embodiment of the present invention.

Therefore, as shown in FIG. 9, when the position in which the radius of light flux of the wavelengths $\lambda_1$ and $\lambda_2$ of the +m order light by a diffraction lens 1 are substantially equal, a diaphragm 2 having a radius substantially equal to that of the light flux arranged. The visual lights of the wavelengths $\lambda_1$ and $\lambda_2$ are wholly passed through the diaphragm 2 without being subjected to shading. On the contrary, In the wavelength range shorter than the wavelength $\lambda_1$ and in the wavelength range longer than the wavelength $\lambda_2$, the light flux is spread rather than the radius of the diaphragm 2 on the plane thereof, so that only a part of the light flux is passed through the diaphragm 2. Therefore, if the diffraction lens 1 has a wavelength dependency of the diffraction efficiency shown in FIG. 8, the diaphragm 2 is arranged at the position in which the radius of light flux of the wavelengths $\lambda_1$ and $\lambda_2$ of the +m order light are substantially equal, the illumination light in which most of wavelength components out of necessary range are not included, can be obtained.

In this case, the diaphragm radius r is defined in the following range; $0.9\ r_0 \leqq r \leqq 1.1\ r_0$, supposing that the radius of light flux of the wavelengths $\lambda_1$ and $\lambda_2$ of +first order light is $r_0$. That is, the diaphragm radius r and the light flux radius $r_0$ do not equal to each other, strictly, the difference in the order of the above range may be allocated. Moreover, if the diaphragm radius r is larger than the light flux radius $r_0$ within the above range, the wavelength range of the light passing through the diaphragm 2 becomes slightly wider than $\lambda_1$~$\lambda_2$, and contrary to this, if the diaphragm radius r is smaller than the light flux radius $r_0$ within the above range, the wavelength range of the light passing through the diaphragm 2 becomes slightly narrower than $\lambda_1$~$\lambda_2$. These variations are slight change, so that there is no problem in practical use.

In this way, according to the present invention, the white light from the light source is diffracted by the relief type diffraction lens, and only the diffraction order light including a number of light components within the necessary wavelength $\lambda_1$~$\lambda_2$ is transmitted through the diaphragm, so that unnecessary infrared light can effectively be removed by the diaphragm, and thus most of its violet light can also be removed. Therefore, the infrared light can effectively be removed without using the infrared cutting filter, and thus the deterioration and the damage of the optical elements which are caused by the heat generation with the infrared absorption can effectively be prevented.

Moreover, the diffraction lens has a blazed shape section, and the maximum value of the diffraction efficiency may be made 100%, so that if the diffraction efficiency is made 100% at preferable wavelength of wavelength range necessary as the illuminating light, bright illuminating light can be obtained. Also, even though the infrared cutting filter is used, if a filter is positioned at the side of the objective point from the diaphragm, the illuminating light incident on the infrared cutting filter does not include most of infrared lights, so that the heat generated in the infrared cutting filters also decreased, substantially, thereby being capable of preventing the deterioration and the damage of the filter, effectively.

In one embodiment according to the present invention, the above wavelengths $\lambda_1$ and $\lambda_2$ are made as following ranges;

$$0.38\ \mu m \leqq \lambda_1 \leqq 0.42\ \mu m$$

$$0.68\ \mu m \leqq \mu_2 \leqq 0.72\ \mu m$$

and only the light of visual range near the wavelength 0.4 $\mu$m to the wavelength 0.7 $\mu$m is transmitted through the diaphragm.

As is seen from FIG. 9, the diaphragm radius must be made long, if the wavelength range $\lambda_1$~$\lambda_2$ is made wide. However, the light without this wavelength range, for example, the infrared light passing through the diaphragm plane and near the optical axis, even the infrared light, is transmitted through the diaphragm. Therefore, the wider the wavelength range $\lambda_1$~$\lambda_2$, the longer the diaphragm radius, thereby increasing the amount of infrared light transmitted through the diaphragm. On the contrary, if the wavelength range $\lambda_1$~$\lambda_2$ is made narrow, the diaphragm radius can be made small. In this case, the light amount of the infrared light transmitting through the diaphragm becomes decreased, but a part of the light in the short wavelength range and the long wavelength range of the visual range is also shielded by the diaphragm, so that the amount of transmitted light becomes also decreased.

However, relative luminous efficiency is very small at a value about 0.7 $\mu$m or more in the case of foveal vision, and is very small at a value about 0.4 or less in the case of scotopic vision, so that even if the light amount is reduced in the range; $0.7\ \mu m \leqq \lambda \leqq 0.4\ \mu m$, this reduction has little effect on the visual observation. Therefore, if light in the wavelength range of about 0.4 $\mu$m~0.7 $\mu$m is transmitted through the diaphragm, the infrared light transmitting through the diaphragm is reduced, and the decrease of light components in the visual range becomes practically insignificant.

Accordingly, if a wavelength of light about 0.4 $\mu$m~0.7 $\mu$m is transmitted through the diaphragm without shading, the illuminating light (which becomes almost trivial) can be obtained for visual observation. Moreover, the infrared light transmitted through the diaphragm is reduced, and the heating caused by absorption of infrared light at the optical elementis reduced, so that the deterioration and the damage caused by the heat of the optical element effectively can be prevented .

In another embodiment the present invention, white light emitted from the light source is diffracted by the relief type diffraction lens. As previously discussed above, if the white light is incident on the relief type diffraction lens, the diffraction order light, rather than the zero order light, is condensed or diverged. In this case, the diffraction angles are different with the order of diffraction, so that +m order light is imaged on the imaging plane of the +m order light (m=1, 2, 3, . . . ), but the other order lights are not imaged but diverged. Therefore, if the light incident end face of the light guide is arranged at the position of imaging plane of +m order light, all the +m order lights are incident on the light guide, and only a part of the other order lights is incident on the light guide, and thus almost of the other order lights are out of the optical path.

Also, in the present invention, as explained above, the sectional shape of the diffraction lens is made in a blazed shape, as shown in FIG. 1*d*. As explained above, such a blazed shape of the diffraction optical element has a property in which the diffraction efficiency of certain diffraction ordered light becomes 100% for certain wavelengths. For example, in the case of a diffraction lens made of quartz, supporting that the depth d of the blazed shape thereof is d=1.08 $\mu$m, the diffraction efficiency od, the +first order light, is 100% at a wavelength of 0.5 $\mu$m. In this case, the wavelength dependency of the zero order light and the +first order light is shown in FIG. 8.

As is seen from FIG. 8, the +first order light is in the visual range and its diffraction efficiency is high; the zero order light is in the infrared range and its diffraction efficiency is high. That is, the +first order light includes a number of light components in the visual range and the zero order light includes a number of light components of the infrared range. Therefore, if the light incident end face of the light guide is arranged at the position of imaging plane of +first order light, all the +first order lights are incident on the light guide, and only a part of the other order lights is incident on the light guide to transmit it to the object point, and thus almost of the other order lights are out of the optical path.

In such a way, if the end face at incident side of the light guide is arranged at the imaging position of the diffraction order light in which the diffraction efficiency of the visual range becomes high, only the visual light of the illuminating light from the light source can be illuminated on the viewing subject through the light guide. Thus, the infrared light does not enter the light guide, and may be out of the optical path, so that unnecessary infrared light can be removed without using the infrared cutting filter. Also, the diffraction lens has a blazed shape section, and the maximum value of the diffraction efficiency may be made 100% at a preferable wavelength or wavelength range necessary as the illuminating light. If the diffraction efficiency is made 100%, a bright illuminating light can be obtained. Moreover, even though the infrared cutting filter is used, if this infrared cutting filter is arranged between the diffraction lens and the light guide, the infrared light passing through the infrared cutting filter is heavily decreased. The heat amount generated in the infrared cutting filter is also decreased substantially, thereby effectively preventing the deterioration and the damage of the filter.

In one embodiment of the present invention, the numerical aperture at the wavelength λ3 of a certain diffraction order light of the diffraction ordered light generated in the relief type diffraction lens is made equal to that of the light guide. In this case, the wavelength λ3 is defined in the following range.

$$0.68\ \mu m \leqq \lambda_3 \leqq 0.72\ \mu m$$

Herein, the numeral aperture (NA) of the optical fiber is designated as following equation;

$$NA=\sin A=(n_1^2-m_2^2)^{1/2} \quad (3)$$

Figure 10:
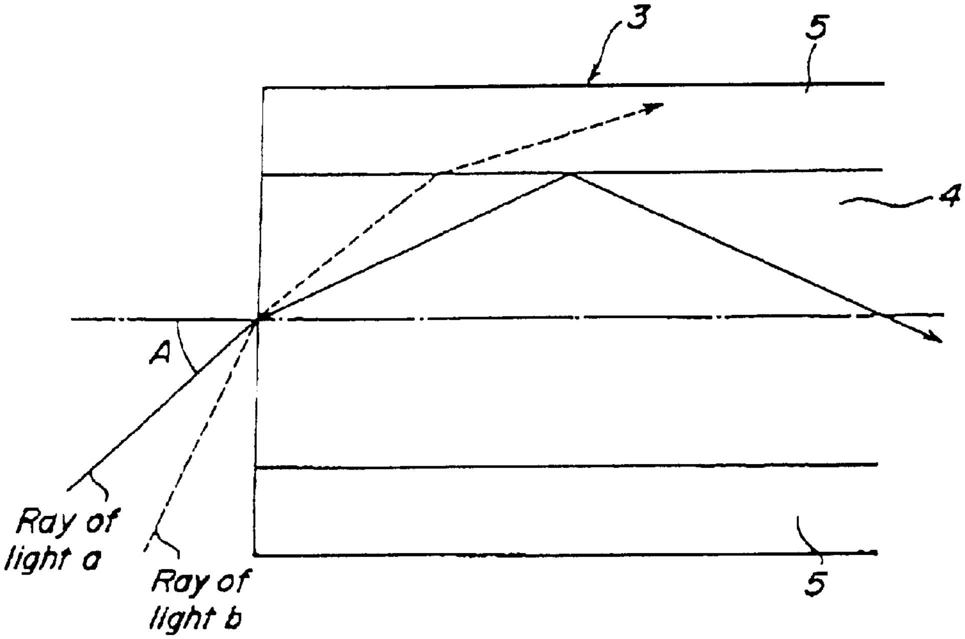
FIG. 10 is a side view showing another embodiment of the present invention.

In the above equation (3), A is an incident angle to the end face at incident side of an optical fiber 3, when the total reflection at the interface of a core 4 and a cladding 5 which constitute the optical fiber 3, as shown in FIG. 10. Also, n, is a refractive index of the cladding 5.

In FIG. 10, the ray a of light incident on the end face at incident side of the optical fiber 3 at an angle A, is subjected to the total reflection, repeatedly at the interface between a core 4 and the cladding 5, and transmitted in the optical fiber 3. The ray b of light incident on the end face at incident side with the incident angle larger than the angle A does not reflect with total refraction at the interface between the core 4 and the cladding 5; nor does the ray b of light refract at this interface and transmit in the cladding 5 and pass therethrough, so that the light is not transmitted in the optical fiber 3.

In this embodiment, when the light is diffracted by the diffraction lens, the larger the diffraction angle, the longer the wavelength of the light. Therefore, the longer the wavelength, the larger is the numerical aperture. For example, if the numerical aperture of the diffraction lens is substantially equal to that of the optical fiber near the wavelength 0.7 μm of the +first order light, or if the light of wavelength shorter than the wavelength 0.7 μm, the numerical aperture of the diffraction lens becomes smaller than the that of the optical fiber. Therefore, all the +first order lights incident on the end face at incident side of the optical fiber are transmitted through the optical fiber.

On the contrary, if the light of the wavelength is longer than the wavelength 0.7 μm, the numerical aperture of the diffraction lens becomes larger than that of the optical fiber. Accordingly, only the lights having a small incident angle near the center, of the +first order light incident on the end face at incident side of the optical fiber, are transmitted through the optical fiber. Moreover, the longer the wavelength is, the larger the numerical aperture, so that only a part of the light at a center is transmitted through the optical fiber. That is, the visual light necessary for an illuminating light transmits the optical fiber effectively, and the infrared light to be removed does not transmit the optical fiber. Moreover, the light guide is constructed by bundling a number of optical fibers, and even considering the light guide as a whole, its numerical aperture is the same as the optical fiber, so that the incident light, with an incident angle larger than the angle A, can not be transmitted through the light guide.

In this way, if the diffraction order light of the diffraction lens by which the diffraction efficiency in the visual range is high and the diffraction efficiency in the infrared range is low, permits utilizing an illuminating light in such a manner that the numerical aperture of the diffraction lens is substantially equal to that of the light guide near the wavelength 0.7 μm of its diffraction ordered light. Only a part of the light components of the infrared range included in its diffraction ordered light can be transmitted through the light guide, so that the infrared light can be removed more efficiently. Therefore, the heat generated in the optical element is further reduced, so that the deterioration and the damage of the optical element can be prevented more efficiently.

Furthermore, in one embodiment of the present invention, the diaphragm having the radius equal to that of the light flux is arranged at a position in which optical flux radius of wavelengths $\lambda_1$ and $\lambda_2$ of the diffraction order light are utilized as an illuminating light are equal to each other on the optical axis between the the relief type diffraction lens and the end face at incident side of the light guide. In this case, the wavelengths $\lambda_1$ and $\lambda_2$ are within the following ranges:

$$0.35\ \mu m \leqq \lambda_1 \leqq 0.45\ \mu m$$

$$0.65\ \mu m \leqq \lambda_2 \leqq 0.8\ \mu m$$

As explained above, the longer the wavelength of the light, the larger the bending of the diffraction light from the diffraction lens. Therefore, if the white light is incident on the diffraction lens, the longer the wavelength, the greater the distance from the diffraction lens to the imaging point. Then, as shown in FIG. 9, if the diaphragm 2 having a radius substantially equal to that of the light flux is arranged at the position in which the radius of light flux of the wavelengths $\lambda_1$ and $\lambda_2$ of the +m order light by a diffraction lens 1 are substantially equal, visual lights of the necessary wavelengths $\lambda_1$ and $\lambda_2$ are wholly passed through the diaphragm 2 without subjecting to the shading by the diaphragm 2. Thus, in the wavelength range shorter than the wavelength $\lambda_1$ and in the wavelength range longer than the wavelength $\lambda_2$, the light flux is spread, rather than the radius of the diaphragm 2 on the plane thereof, so that only a part of the light flux is passed through the diaphragm 2.

Therefore, if the diffraction lens has a wavelength dependency of the diffraction efficiency shown in FIG. 8, the diaphragm is arranged at the position in which the radius of light flux of the wavelengths $\lambda_1$ and $\lambda_2$ of the +first order light are substantially equal. Only the light components of wavelengths $\lambda_1$~$\lambda_2$ of the +first order light incident on the light guide are transmitted through the diaphragm and incident on the light guide, and thus the light components of the infrared range included in the +first order light can be removed by the diaphragm.

In this way, if only the light components of the necessary wavelength range $\lambda_1$~$\lambda_2$ are transmitted through the diaphragm, and the infrared light included in the diffraction ordered light used as an illuminating light are further removed, the illuminating light consisting of only the light components of visual range can be obtained. By this way, the infrared light can be further removed efficiently, and thus the deterioration and the damage of the optical element or the like due to the heat generated by the absorption of infrared light can be prevented efficiently.

Moreover, in one embodiment according to the present invention, the above wavelengths $\lambda_1$ and $\lambda_2$ are made as following ranges;

$$0.38\ \mu m \leqq \lambda_1 \leqq 0.42\ \mu m$$

$$0.68\ \mu m \leqq \mu_2 \leqq 0.72\ \mu m$$

and only the light of visual range near the wavelength 0.4 $\mu$m to the wavelength 0.7 $\mu$m is transmitted through the diaphragm.

As explained from FIG. 9, if the range of the wavelength $\lambda_1$~$\lambda_2$ is spread, the diaphragm radius must be long, thereby increasing the light amount of the infrared light transmitting through the diaphragm. On the contrary, if the wavelength range $\lambda_1$~$\lambda_2$ is made narrow, the diaphragm radius can be made small. Thus the amount of the infrared light transmitted through the diaphragm can be decreased, but a part of the light in the short wavelength range and the long wavelength range of the visual range is also shielded by the diaphragm, so that the amount of visible transmitted light also becomes decreased. However, relative luminous efficiency is very small, at a value about 0.7 $\mu$m or more in the case of foveal vision, and is very small at a value about 0.4 or less in the case of scotopic vision. Even if the light amount is reduced in the range of $0.7\ \mu m \leqq \lambda \leqq 0.4\ \mu m$, this reduction has little effect on the visual observation. Therefore, if the light in the wavelength range of about 0.4 $\mu$m~0.7 $\mu$m is transmitted through the diaphragm, the infrared light transmitted through the diaphragm becomes less, and the reduction of light components in the visual range becomes practically insignificant.

Moreover, if a wavelength of about 0.4 $\mu$m~0.7 $\mu$m is transmitted through the diaphragm without shading and incident on the light guide, the illuminating light (which becomes almost trivial) can be obtained for visual observation. Moreover, in this case, the infrared light transmitted through the diaphragm is also reduced, so that the heating caused by absorption of infrared light in the optical element is reduced, and thus the deterioration and the damage caused by the heat of the optical element can be prevented effectively.

Also, in another embodiment of the present invention, the depth d of the concave portion of relief pattern of the relief type diffraction lens is defined as following range:

$$0.74\ d_0 \leqq d \leqq 1.43\ d_0$$

wherein d0 is depth of concave portion in the case of diffraction efficiencies of +first order light being equal the each other at wavelengths 0.4 $\mu$m and 0.7 $\mu$m.

As discussed above before, when the equation (2) is set up, the diffraction efficiency of +m order light becomes 100%. In this case, there are several combinations of m and wavelength for holding the equation (2), but preferably this combination is made m=+1, since the larger m is, the deeper the depth d of the concave portion, so that the production of the diffraction lens becomes difficult. Also, since the wavelength range using as the illuminating light is on the order of 0.4 $\mu$m to 0.7 $\mu$m, so that if the diffraction efficiency of +first order light is equal with wavelengths 0.4 $\mu$m and 0.7 $\mu$m, that is, if there is $d=d_0$, the diffraction efficiency of +first order light becomes high in the above whole wavelength range.

Figure 11:
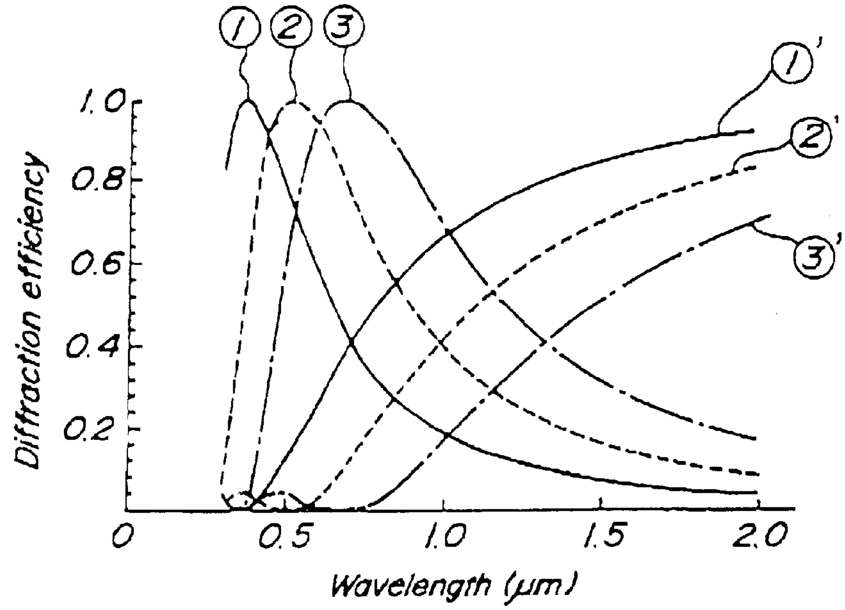
FIG. 11 is an explanatory view showing one embodiment of wavelength dependency of diffraction efficiency of zero ordered light and ±first ordered light when the depth d of the concave portion is 0.74 $d_0$, 1 $d_0$ and 1.43 $d_0$, respectively, in the relief type diffraction optical lens having a construction of sectional view in a blaze shape shown in FIG. 7.

Even in the case of blazed shape, the diffraction efficiency changes when depth of concave portion changes in the same manner as the rectangular relief pattern. FIG. 11 shows wavelength-dependency of diffraction efficiency of the +first ordered light and the zero order light in case of $d=0.74\ d_0$, $1\ d_0$ and $1.43\ d_0$. In this case, the diffraction optical element is made thin and made of quartz as well as its surface reflection is not considered. In FIG. 11, curves shown by marks ①, ②, and ③ are graphs of the +first order light in case that depth of concave portion is $0.74\ d_0$, $1\ d_0$ and $1.43\ d_0$, respectively and curves shown by marks ①', ②', and ③' are graphs of the zero order light in case that depth of concave portion is $0.74\ d_0$, $1\ d_0$ and $1.43\ d_0$, respectively.

As is found from FIG. 11, if depth d of concave portion is greater than $0.74\ d_0$, the diffraction efficiency of +first order light is higher than the diffraction efficiency of zero order light to be removed in the above wavelength range. Moreover, if the depth d of concave portion is less than $1.43\ d_0$, the diffraction efficiency of +first order light is 10% or greater in the above wavelength range, and is higher than the diffraction efficiency of zero order light. Accordingly, if the depth d of concave portion has $0.74\ d_0 \leqq d \leqq 1.43\ d_0$, the +first order light is always stronger than the zero order light (in the visible range) for use as an illuminating light, and the diffraction efficiency becomes 10% or more.

In this way, by losing depth of concave portion d with $0.74\ d_0 \leqq d \leqq 1.43\ d_0$, in the visible range of wavelength 0.4 $\mu$m to 0.7 $\mu$m, the diffraction efficiency of +first order light used as illuminating light can be made higher than the diffraction efficiency of zero order light to be removed. Accordingly, the visible light is diffracted as a +first order light and thus the viewing subject can be illuminated and brighter illuminating light can be obtained.

Moreover, in another embodiment of the present invention, the diffraction optical element and diffraction lens are made by quartz.

In other words, the quartz has high transmittance for the light in the wavelength range of about 0.2 $\mu$m to 0.2 $\mu$m. Therefore, even if infrared light less than wavelength 4 $\mu$m enters into the quartz, the infrared light is not absorbed, but is transmitted. Also, a halogen lamp, a xenon lamp and a metal halide lamp used as a broad light source, have high strength at a wavelength range shorter than a wavelength 3 $\mu$m, and this strength is not much stronger at the wavelength range longer than it. Accordingly, the infrared light generated from the light source is not absorbed if the diffraction optical element and the diffraction lens are made by quartz. The quartz itself almost does not generate heat, and thus deterioration and a damage caused by a heat can be prevented effectively.

Moreover, in one embodiment of the present invention, the illuminating optical system is used to constitute an endoscope system.

In this way, if such an endoscope system is constituted, as described above, the infrared light is hardly contained in the illuminating light emitted from illumination optical system. Thus, the infrared light is hardly contained in the illuminating light emitted from a distal inserting section of the endoscope. Accordingly, the viewing subject can be illuminated and viewed without heating . Because every kind of optical element positioned between the illumination optical system and the viewing subject is not heated, the deterioration and the damage of the optical elements caused by a heat can be prevented effectively, providing a high durable endoscope system.

There are various embodiments shown of an illuminating optical system according to the present invention. Like parts are shown by corresponding reference characters throughout several views of the drawings.

Figure 12:
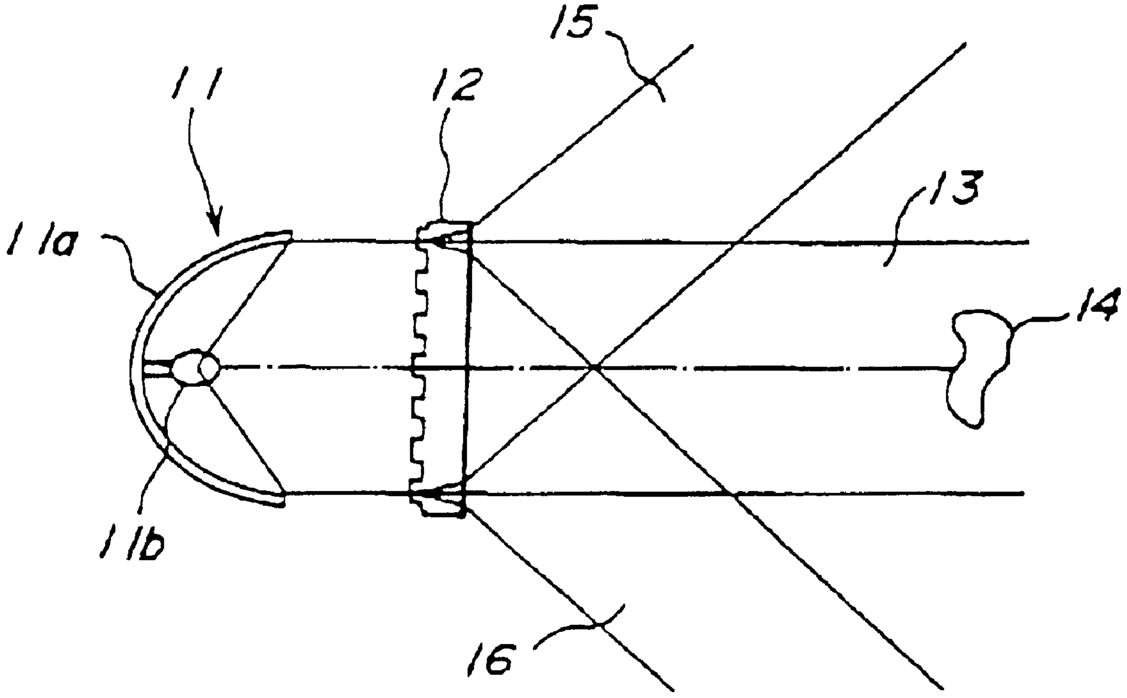
FIG. 12 is a side view showing first embodiment of an illumination optical system according to the present invention.

FIG. 12 shows the first embodiment of the illuminating optical system according to the present invention. In this embodiment, white light containing light components of at least the visible range and the infrared range from a light source 11, having a reflection mirror 11*a* and a lamp 11*b* entered into a relief type diffraction optical element 12, diffract light into light of several orders of diffraction. A straight propagating zero order light 13 illuminates a viewing subject 14. Herein, in the case of observation of visible light, a xenon lamp, a halogen lamp and/or a metal halide lamp which have large emissions in the visible range, are used as the lamp 11*b*. Moreover, a diffraction optical element 12 is formed in such a manner that its relief pattern has a rectangular sectional shape and its grating distance becomes an equal interval.

In this embodiment, m order light diffracted by the diffraction optical element 12, for example, +first order light 15 or-first order light 16 are propagated in the direction different from zero order light 13. The Light flux of these m order lights is apart from the light flux of the zero order light 13, as it is apart from the diffraction optical element 12. Therefore, when the viewing subject 14 is positioned in the direction leaving the diffraction optical element 12 and the position that the zero order light 13 and the ±first light 15, 16 are completely separated, the high order light is diffracted with a large angle, so that the light rather than zero order light 13 is out of the optical path and does not enter into the viewing subject 14.

As is explained above, the diffraction efficiency of the relief type diffraction optical element 12 is different by a wavelength of incident light. Also, the order of diffraction that diffraction efficiency becomes highest is different by a wavelength. In this embodiment, the diffraction optical element 12 has a rectangular sectional shape and an equidistant grating distance. Thus the diffraction efficiency of ±the first light 15, 16 is the greatest at 40.5%, and the diffraction efficiency of the zero order light 13 is the greatest at 100%.

As is found from FIG. 2, when the diffraction efficiency of the ±first light 15, 16 becomes maximum in the infrared range of wavelength 1.0 $\mu$m, the diffraction efficiency of the zero order light 13 becomes low in the infrared range. Moreover, the diffraction efficiency of the zero order light 13 becomes high in the visible range of near wavelength 0.5 $\mu$m, and the diffraction efficiency of the ±first light 15, 16 becomes low. That is, the zero order light 13 contains light components of the visible range much, and the ±first light 15, 16 contain light components of the infrared range much. Accordingly, if the zero order light 13 is used as an illuminating light, and the ±first light 15, 16 are out of the optical path, even if the conventional infrared cutting filter is not used, the infrared light can be removed from the optical path. Moreover, even when the infrared cutting filter is used, if the infrared cutting filter is arranged after the infrared light is out of the optical path at the diffraction optical element 12, the infrared light transmitted through the infrared cutting filter decreases largely, and calorific power value at the infrared cutting filter decreases, too, and deterioration of the cutting filter can be suppressed.

Moreover, the diffraction angle by diffraction optical element 12 depends on a wavelength. Generally the shorter is the wavelength the smaller is the diffraction angle; also the longer is the wavelength, the larger is the diffraction angle. Accordingly, the ±m order light disperses after diffracted, but the zero order light 13 does not disperse by the wavelength, so that all the light with whole wavelength progresses in the same direction. In this embodiment, this zero order light 13 is used as an illuminating light, so that the illuminating light with no color dispersion can be obtained.

Then, it is desirable that the diffraction optical element 12 has a linear shaped relief pattern as shown in FIG. 13*a*, or a concentric shaped relief pattern as shown in FIG. 13*b*. That is, in the case of FIG. 13(*a*), the light is subjected to a diffraction action in only the direction orthogonal to the direction of the linear shaped relief pattern. Respective diffracted order lights are separated in the direction orthogonal to the linear pattern as shown in FIG. 14(*a*). The greater the respective diffracted order lights one out of the diffraction optical element 12, the greater is the above separation. Accordingly, if the respective diffracted order lights are separated to some extent from diffraction optical element 12, the zero order light 13 and the (+) first order lights 15, 16 are fully separated from each other. If the viewing subject 14 is arranged apart from the diffraction optical element 12, the (+) first order light 15, 16 including a number of the light components of the infrared range, can be removed and only zero order light 13, including a number of light components of visible range, can be taken out as an illumination light. Thus, the viewing subject 14 can be illuminated by illumination light where the strength of the infrared light is weaker, and the strength of the visible light is stronger.

Moreover, in the case of FIG. 13*b*, the light is subjected to a diffraction action only in the radius direction of the concentric relief pattern to effect as an axicon.

Accordingly, respective diffracted ordered lights are separated as shown in FIG. 14(*b*). In the case of linear relief pattern, the more the respective diffracted order lights are out of the diffraction optical element 12, the greater is the above separation. Accordingly, if respective diffracted order lights are separated some extent from diffraction optical element 12, the zero order light 13 and the (+) first order lights 15, 16 are fully separated from each other If the viewing subject 14 is arranged apart from the diffraction optical element 12, the (+) first order lights 15, 16, including a number of the light components of the infrared range, can be removed and only zero order light 13, including a number of light components of visible range, can be taken out as an illumination light. Thus, the viewing subject 14 can be illuminated by the illumination light such that the strength of the infrared light is weaker, and the strength of the visible light is stronger.

Herein, if the diffraction optical element 12 and the viewing subject 14 are too apart from each other, and the viewing subject 14 can not be illuminated directly, since there is a shading object between them, an light guide can be used. In this case, as shown in FIG. 15, the zero order light 13 which diffracted with the diffraction optical element 12, and fully separated from the (+) first order lights 15, 16 is condensed by a condenser lens 17, is incident on the end face 19 at an incident side of the light guide 18, and is propagated therein, so that the light emitted from the end face at the emitting side of the light guide can illuminate the viewing subject 14 on the object point as an illuminating light.

In this way, if the condenser lens 17 is arranged after the complete separation of the +first ordered lights 15, 16 and zero order light 13, the (+) first order light 15, 16 are moved away from the optical path, and only the zero order light 13 can be condensed, so that the (+) first order light 15, 16 including a number of the light components of the infrared range can be removed and only zero order light 13 including a number of light components of visible range can be lead to the viewing subject 14 through the light guide 18 as an illumination light. Accordingly, the illuminating light that strength of the infrared light is weaker, and strength of the visible light is stronger, can be obtained.

In the relief pattern of diffraction optical element 12, the ratio β between the width and pitch of the convex portion need not be always 0.5, if this is following range;

$$0.34 \leqq \beta \leqq 0.66,$$

enough effect practicality can be obtained. That is, as shown in FIG. 4, when the ratio P is changed, the diffraction efficiency of the (+) first ordered lights 15, 16 and the zero order light 13 are changed.

Herein, the range of the above ratio β is a hatched portion A shown in FIG. 4, and in this range, the diffraction efficiency of (+) first ordered lights 15, 16 is high, and diffraction efficiency of the zero order light 13 is 10% or less However, in this embodiment, the (+) first order lights 15, 16 are out of the optical path and is removed, so that when the diffraction efficiency of the (+) first order lights 15, 16 becomes highest in the infrared range as shown in FIG. 2, the light components of the infrared range is diffracted as (+) first order light almost, and is removed. On the other hand, there is a little infrared light contained in the zero order light 13 for illuminating the viewing subject 14 as an illumination light. Accordingly, if the ratio β is in the above range, the infrared light can removed well efficiency and there become a more few heats too infrared light caused by the absorption of infrared light in optical elements, so that the deterioration and damage of the optical element can be suppressed more effectively. Also, since a value of the ratio β has a certain allowance, the diffraction optical element 12 can be produced advantageously.

More preferably, the ratio β of the width and the pitch of the above convex portion is defined in the following range;

$$0.45 \leqq \beta \leqq 0.55$$

The range of this ratio β is a hatched portion B shown in FIG. 4, and in this range, in particular, the diffraction efficiency of the (+) first ordered lights 15, 16 is high, and diffraction efficiency of the zero order light 13 is 1% or less. Accordingly, when the diffraction efficiency of the (+) first order lights 15, 16 becomes highest in the infrared range as shown in FIG. 2, more of the light components of the infrared range is diffracted as (+) first order light almost, and is removed, and thus, the infrared light contained in the zero order light 13 for illuminating the viewing subject 14 as an illumination light becomes more less, so that the infrared light can be removed well efficiently. Accordingly, there become a more few heats too infrared light caused by the absorption of infrared light in optical elements, so that the deterioration and damage of the optical element can be suppressed more effectively.

Moreover, when the depth of concave portion is made $d_0$ in such a manner that diffraction efficiency of the zero ordered light 13 in wavelength 0.4 μm and 0.7 μm become equal to each other, the depth d of the concave portion of the relief pattern of the diffraction optical element 12 is preferably defined as follows;

$$d=d_0$$

That is, the wavelength-dependency of diffraction efficiency of the zero order light in the case of the depth of the concave portion being $d_0$, becomes show by the mark ② in FIG. 5. Herein, the diffraction optical element 12 is made by quartz, and $d_0$ is 1.095 μm. The wavelength range used as the diffraction illuminating light is a visible range of 0.4 μm to 0.7 μm and in this wavelength range, diffraction efficiency of the zero order light 13 using as an illuminating light had better be high. As is seen from FIG. 5, in the case of $d=d_0$, or diffraction efficiency of the zero order light 13 is the lowest, that is, 35% or more in wavelength 0.4 μm and 0.7 μm, so that particularly, bright illumination light can be obtained. Moreover, wavelength-dependency of quantity of light becomes small in the wavelength 0.4 μm to 0.7 μm, so that the illumination light having more flat spectral characteristic can be obtained.

Moreover, the depth d of the above concave portion need not be always $d_0$, but can be made following range;

$$0.85\ d_0 \leqq d \leqq 1.09\ d_0$$

this range can obtain an enough effect in practical use. In other words, wavelength-dependency of diffraction efficiency of the zero order light in each case of $d=0.85\ d_0$ and $d=1.09\ d_0$ is as shown in FIG. 5 by the marks ① and ③, respectively. As shown in FIG. 5, If the depth d of the concave portion is in the above range, the diffraction efficiency of the zero order light 13 is 10% or more at least, so that the bright illuminating light can be obtained in practical use in necessary wavelength range all the area.

Also, if the above depth d is following range;

$$0.96\ d_0 \leqq d \leqq 1.02\ d_0$$

more enough effect can be obtained. That is, the wavelength-dependency of diffraction efficiency of the zero order light in each case of $d=0.96\ d_0$ and $d=1.02\ d_0$ is as shown in FIG. 6 by the marks ① and ③, respectively.

As shown in FIG. 6, if the depth d of concave portion is in the above range, in particular, the diffraction efficiency of the zero order light 13 is high with at least 30% or more, so that the bright illuminating light can be obtained in practical use in necessary wavelength range all the area.

In this embodiment, the ±m order light diffracted by the diffraction optical element 12 and out of the optical path, in particular, the ±the first lights 15, 16 include infrared light much. For example, in a barrel portion, into which these diffraction order lights enter, a heat is generated, so that it is desirable for the part to arrange the radiation means, by which a heat is easy to diverge. For example, as one example of the radiation means, as shown in FIG. 16, the shape of a part of barrel 20 for entering the ±first order light is made in a fin shape to increase the surface area, thereby promoting the heat divergence. Moreover, the barrel 20 is subjected to an air-cooling or a water cooling. In this way, heat generation of the barrel 20 can be prevented, deterioration and damage of the barrel itself, the optical element caused by the heat that reached from barrel 20 more and deterioration and damage of other parts can be prevented effectively.

Figure 17A:
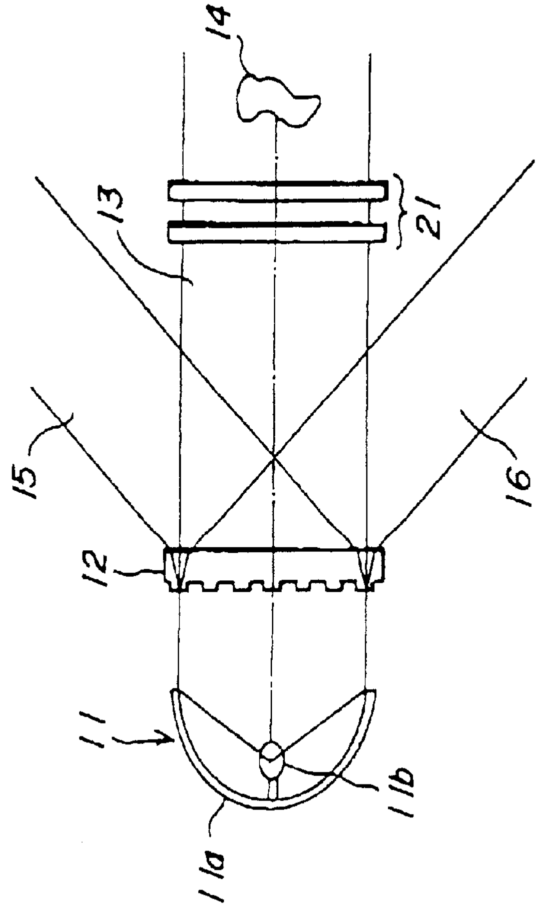
FIGS. 17*a* and 17*b* are side views showing the construction of the illumination optical system provided with the infrared cutting filter in FIGS. 12 and 15.

The above explanation was the case that the infrared cutting filter was not arranged in the optical path, infrared cutting filter can also be arranged in the optical path. That is, as seen from FIG. 2, the zero order light 13 has high strength in the visible range, the light components of the infrared range of near wavelength 1.0 μm are removed from the zero order light 13, but the components of infrared range longer than it have been left a few. These remained light components of infrared range may be removed by the infrared cutting filter. In case of constitution that this infrared cutting filter is shown by FIG. 12, as shown in FIG. 17(*a*), it is preferable to arrange an infrared cutting filter 21 between the diffraction optical element 12 and the viewing subject 14 at the near side of the viewing subject 14 than the position that the zero order light 13 and the ±first order lights 15, 16 are completely separated. Moreover, in case of constitution that this infrared cutting filter is shown by FIG. 15, and as shown in FIG. 17(*b*). It is preferable to arrange the infrared cutting filter 21 between the diffraction optical element 12 and the condenser lens 17 at the near side of the condenser lens 17 than the position that the zero order light 13 and the ± first order lights 15, 16 are completely separated.

Figure 17B:
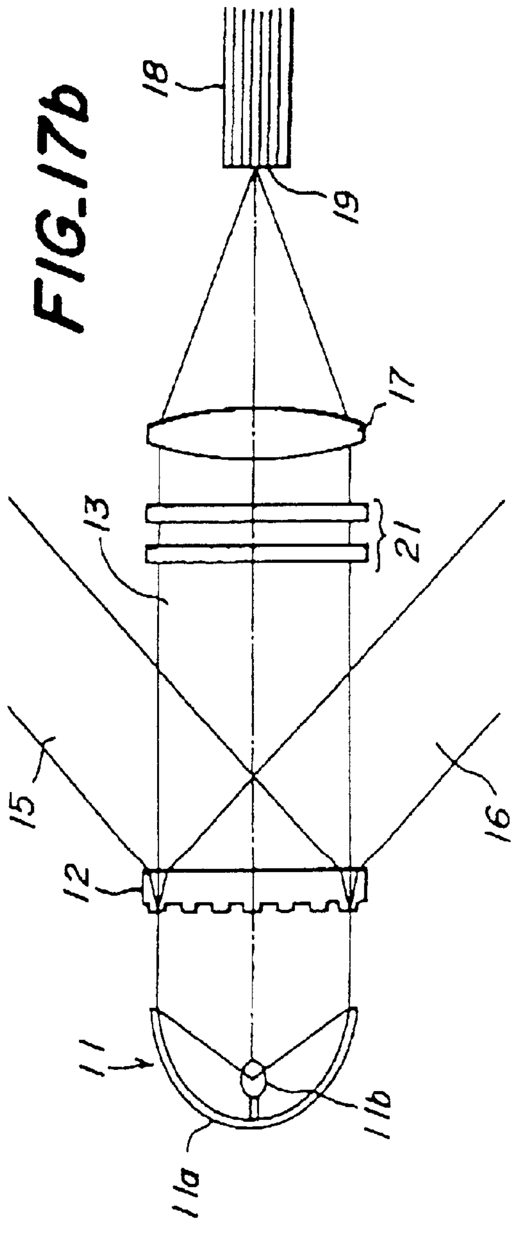

In this way, only the zero order light 13 enters into the infrared cutting filter 21, and the ±first order lights 15, 16 containing much light components of infrared range do not enter into the infrared cutting filter 21, so that calorific power value due to the infrared cutting filter 21 can be reduced, and the deterioration can be prevented effectively. Moreover, as shown in FIG. 17*b*, if the light guide 18 is used, the illuminating light enters into the condenser lens 17 through the infrared cutting filter 21, so that a light quantity of the infrared light entering into the condenser lens 17 and the light guide 18 decreases further. Accordingly, the damage and deterioration of optical element caused by a heat generation can be prevented more effectively.

Also, in this embodiment, it is desirable for diffraction optical element 12 to be made by quartz. That is, a quartz has high transmittance for the light of wavelength range of about 0.2 μm to 4 μm, so that even if in case of entering the infrared light less than wavelength about 4 μm into the quartz, it is not absorbed by the quartz, but is transmitted therethrough. Moreover, a halogen lamp, a xenon lamp, and a metal halide lamp which are usually used as light source 11 have a high strength at a wavelength shorter than 3 μm or so, and they do not have much strength at a wavelength range longer than 3 μm. Accordingly, if the diffraction optical element 12 is made by quartz, rather than the infrared light generated from the light source 11 being absorbed, it is transmitted through the diffraction optical element 12 and out of the optical path by the diffraction. Thus, the heat generation of the diffraction optical element 12 and the deterioration and damage of the diffraction optical element 12 by heat can be prevented effectively.

FIG. 8 shows a second embodiment of an illuminating optical system according to the present invention. In this embodiment, white light containing light components in at least the visual range and the infrared range from the light source 11 having a reflection mirror 11*a* and a lamp 11*b*, enter into a relief type diffraction lens 25. The light is then diffracted into plural diffraction order light, and then its +first order light 26 is taken out through a diaphragm 27 to illuminate a viewing subject 14. In the case of visible light, a xenon lamp, a halogen lamp, and a metal halide lamp all of which have large emissions in the visible range, are used the same as explained as in the first embodiment. Moreover, as explained previously, the relief type diffraction lens 25 is a kind of a relief type diffraction optical element, as shown in FIG. 7, which diffracts light by a pattern in the shape of concentric circles having a constitution in the depth direction formed at its surface. Thus, the relief type diffraction optical element has a lens action. In this embodiment, a section shape of this relief pattern is made in a blazed shape.

In FIG. 6, the light entering into the diffraction lens 25 is diffracted to separate plural diffraction order lights, and its zero order light 28 is transmitted in a straight path, and thus ±m order light is diffracted and is either condensed or is diverged. Herein, supporting that a mark of diffraction order light is made positive in case of being bent in the direction of condensing and is made negative in case of being diverged in the direction of diverging. The focal length of the +first order light 26 is longest, and the focal length shortens as the order of diffraction such as the +second order light, the +third order light and the like increases. Therefore, on the imaging plane of +m order light (m=1,2,3, . . . ), the +m order light is imaged, but the other order lights do not image, and are spread. Accordingly, if a diaphragm having a size such that light flux of the +m order light just seems to be transmitted and is arranged at a position of an imaging plane of the +m order light, then all the +m order light is transmitted through the diaphragm to be spread. The viewing subject 14 is illuminated, but only part of any other order light is transmitted, and thus the greater parts thereof are out of the optical path, and are shielded by the diaphragm. Then, in this embodiment, the diaphragm 27 is arranged at a position of an imaging plane of the +first order light 26, thereby transmitting only the +first order light 26, illuminating the viewing subject 14, while the greater parts of the light, such as zero ordered light 28 or +second ordered light 29, are taken out of the optical path, and are shield by the diaphragm 27.

The diffraction lens 25 shown in FIG. 18 is explained in further detail. Sectional shape of relief pattern of the diffraction lens 25 is the blaze shape, as shown in FIG. 1(*d*). The blaze shaped diffraction optical element has a nature that diffraction efficiency of a diffraction ordered light becomes 100% in a certain wavelength. As explained previously, when the phase difference of the peak and the valley of blazed shape become an integer multiple of 2 (that is, the depth d of concave portion satisfies the above equation (1)), the diffraction efficiency of the +m order light at wavelength λ becomes 100%. Moreover, in this embodiment, the diffraction lens 25 is positioned in the air, in the above equation (1), following equation is obtained: $n_0(\lambda)=1$. Therefore, the depth d of concave portion that diffraction efficiency becomes 100%, can be expressed in the above equation (2).

When the depth of concave portion is fixed, there are plural combinations of wavelength λ and order m of diffraction. The larger is m, the shorter is the wavelength. For example, when the depth d of concave portion is d=1.08 μm, by which the equation (2) is held, the diffraction efficiency of the +first order light 26 becomes 100% at wavelength 0.5 μm, and the diffraction efficiency of the +second order light 29 becomes 100% at wavelength 0.27 μm. In this case, if only the +first order light 26 is derived, the visible light around the wavelength 0.5 μm can be obtained. In this way, the wavelength range can be selected by selecting order of diffraction, since the wavelength that diffraction efficiency becomes 100% by order of diffraction, is different.

As explained previously, the wavelength dependency of diffraction efficiency of the zero order light and the +first order light in the case of the depth d is d=1.08 μm, as shown in FIG. 8. As for the +first order light, the diffraction efficiency is high in the visible range as shown in FIG. 8, and, for the zero order light, the diffraction efficiency increases in the infrared range. In other words, the +first order light contains mostly light components in the visible range, and the zero order light contains mostly light components in the infrared range. Accordingly, as set forth in this embodiment, if the diaphragm 27 transmits only the +first order light 26, and shields the intercept zero order light 28 and other diffraction order light, the illuminating light almost consisting of light components of visible range can be obtained.

As described above, there are plural combinations of wavelength λ and order m of diffraction, by which the equation (2) is held. The larger is the m, the deeper is the depth d of the concave portion. Since this increased d causes increased complexity. Therefore, it is preferable to make m=+1.

In this embodiment, as shown in FIG. 8, the depth d of concave portion of diffraction lens 25 is made a value that the diffraction efficiency of the +first order light 26 increases in the visible range, and the diaphragm 27 is arranged in the imaging plane, thereby transmitting only the +first order light 26. Therefore, the +first order light 26 containing light components in the visible range is transmitted through the diaphragm 27, so that the viewing subject 14 can be illuminated. Also, the light components in the infrared range is taken out of the optical path by being diffracted as other diffraction order light, or shielded by the diaphragm 27, and is thus removed from the illuminating light. Accordingly, unnecessary infrared light can be removed effectively without using infrared cutting filter.

Moreover, the relief pattern of diffraction lens 25 has a blazed sectional shape, and its diffraction efficiency becomes roughly 100% for a certain wavelength. As shown in FIG. 8, the bright illuminating light can be obtained by using the diffraction lens of another shape, by making the diffraction efficiency for a wavelength in the visible range 100% for the +first order light 26. In addition, as for the diffracted light, except the +first order light such as zero order light, the diffraction efficiency in visible range is low. Low diffraction efficiency results in light energy in the visible range being emitted from the light source 11 is concentrated on the +first order light 26, and thus used effectively.

Then, the diaphragm 27 is arranged near a focal position of the +first order light 26, in such a manner that the diaphragm passes only the +first order light 26 having strong light strength in visible range. In particular, the diaphragm shields the other order light having strength in the infrared range, such as the zero order light 28. However, in this case the radius of light flux is made a position that the radius of light flux of wavelength $\lambda_1$ and wavelength $\lambda_2$ of the +first order light 26 become almost equal to each other. In this case, the wavelength $\lambda_1$ and wavelength $\lambda_2$ are defined as following ranges;

$$0.35\ \mu m \leqq \lambda_1 \leqq 0.45 \mu m$$

$$0.65\ \mu m \leqq \lambda_2 \leqq 0.8\ \mu m$$

assuming that diaphragm radius of the diaphragm 27 is r, and the radius of light flux of wavelength $\lambda_1$ and wavelength $\lambda_2$ of the +first order light 26 is $r_0$, the diaphragm radius r is made following range;

$$0.9\ r_0 \leqq r \leqq 1.1\ r_0$$

As described above, if the light is diffracted by the diffraction lens, the longer the wavelength of light, the larger amount that the light curves. Accordingly, the longer the is wavelength, the shorter is the distance from the diffraction lens to the imaging point. Therefore, as shown in FIG. 9, if the diaphragm, having radius almost equal to the radius of light flux, is arranged at the position where a radius of the light flux of wavelength $\lambda_1$ and wavelength $\lambda_2$ of the +m order light become almost equal to each other, then the necessary wavelength range $\lambda_1$ to $\lambda_2$ is passed through the diaphragm without shading, the light flux of a wavelength range longer than wavelength $\lambda_1$ and a wavelength range longer than wavelength $\lambda_2$ is spread; thus, only a part of the light flux thereof can be transmitted.

Therefore, as shown in FIG. 18, diffraction lens 25 has wavelength-dependency of diffraction efficiency as shown in FIG. 8, the diaphragm 27 is arranged at the position that the radius of light flux of wavelength $\lambda_1$ and wavelength $\lambda_2$ of the +first order light 26 becomes almost equal. In this case, only the +first order light 26 is transmitted and only the light components in the necessary wavelength range $\lambda_1$~$\lambda_2$ contained therein are transmitted. Thus, the infrared light contained in the +first order light 26, used as an illuminating light, can be removed more effectively. Therefore, the illuminating light hardly contains wavelength components outside of the necessary wavelength range which can be obtained. Thus, the deterioration and damage of optical elements due to a heat caused by absorption of the infrared light can be prevented more effectively.

More preferably, the above wavelengths $\lambda_1$ and $\lambda_2$ are defined as following range:

$$0.38\ \mu m \leqq \lambda_1 \leqq 0.42\ \mu m$$

$$0.68\ \mu m \leqq \lambda_2 \leqq 0.72\ \mu m$$

In this way, only the light having wavelength in visible range of about 0.7 μm to 0.4 μm can be transmitted through the diaphragm 27. Herein, as shown in FIG. 9, the wider is the wavelength range $\lambda_1$~$\lambda_2$, the larger is the diaphragm radius of the diaphragm 27, even in the light without this wavelength range. For example, in the case of infrared light, the light passing near the optical axis in the diaphragm plane is transmitted through the diaphragm 27. Therefore, the wider the wavelength range $\lambda_1$~$\lambda_2$, the larger is the diaphragm radius. The result is that the quantity of light of the infrared light transmitted through the diaphragm 27 can be increased.

On the contrary, if the wavelength range $\lambda_1$~$\lambda_2$ is made narrow, the radius of diaphragm can be small, and thus the quantity of the infrared light transmitted through the diaphragm 27 can also be decreased further, so that a part a short wavelength range and a long wavelength range within the visible range is shielded by the diaphragm 27; thus, a quantity of light is decreased. However, relative luminous efficiency is more than about 0.7 μm in the case of foveal vision, and a value thereof is very small, (less than about 0.4 μm). In the case of scotopic vision, a value thereof is very small also, so that even if a quantity of light decreases in the wavelength range of 0.4 μm to 0.7 μm, practically there is no influence on visual observation. Therefore, if a range wavelengths from about 0.7 μm to about 0.4 μm is transmitted through the diaphragm 27, there is a little infrared light transmitted through diaphragm 27. Moreover, the decrease of light components in the visible range can provide better illuminating light which does not affect its practical use.

Then, as for depth d of concave portion of relief pattern of the diffraction lens 25, it is desirable for the depth to be a value that the diffraction efficiency increases in the visible range of the +first order light 26. When the diffraction efficiency of the +first order light 26 in wavelength 0.4 μm and 0.7 μm is assumed as $d_0$, the following relation may be defined;

$$d=d_0$$

In this case, if the diffraction lens 25 is made by quartz, the depth $d_0$ becomes $d_0$=1.095 μm, the wavelength-dependency of diffraction efficiency of the +1 first order light 26 and the zero order light 28 are as shown in FIG. 11 by the marks {2} and {2'}, respectively.

That is, because the wavelength range using as an illuminating light is in visible range of 0.4 μm to 0.7 μm, diffraction efficiency of the +first order light 26 used as an illuminating light needs to be high in this wavelength range. In this case, assuming that $d=d_0$, as described above, as is seen from FIG. 11, the diffraction efficiency of the +first order light 26 is high with 75% or more, even in the lowest case. For example, even in wavelengths that are between 0.4 μm and 0.7 μm, a particular bright illuminating light can be obtained. Also, in the wavelength range of 0.4 μm to 0.7 μm, the wavelength-dependency of the quantity of light is small, and illuminating light having more flat spectrometric characteristics can obtained.

In addition to the above, depth d of concave portion of relief pattern of the diffraction lens 25 need not always be made $d=d_0$. In this case the range is defined as following:

$$0.74\ d_0 \leqq d \leqq 1.43\ d_0,$$

enough effect can be obtained in practical use. That is, diffraction efficiency of the +first order light 26 and the zero order light 28 in the case of $d=0.74\ d_0$ are as shown in FIG. 11 by the mark {1} and {1'}, and diffraction efficiency of the +first order light 26 and the zero order light 28 in the case of $d=1.43\ d_0$ are as shown in FIG. 11 by the mark {3} and {3'}.

As shown in FIG. 11, if the depth d of concave portion is made $0.74\ d_0$ or more, the diffraction efficiency of the +first order light 26 in the above wavelength range becomes higher than that of the zero order light 28 to be removed. If the depth d of concave portion is made $1.43\ d_0$ or less, the diffraction efficiency of the +first order light 26 is 10% or more in the above wavelength range and is higher than the diffraction efficiency of the zero order light 28. Accordingly, if the depth d of concave portion is in the following range, $0.74\ d_0 \leqq d \leqq 1.43\ d_0$, the +first order light 26 is more powerful than the zero order light 28 to be removed; this degree of power is true in the visible range, using an illuminating light and becoming 10% or more, so that by using the +first order light 26, fully bright illuminating light can be obtained in practical use in any part of the necessary wavelength range.

In addition to the above, even in this embodiment, the diffraction order light, in particular, the zero order light 28 which is taken out of the optical path due to the diffraction by the diffraction lens 25 or shielded by the diaphragm 27, contains mostly light component in infrared range, so that the heat generates in the barrel portion and the diaphragm 27, wherein these diffraction order lights enter into. Then, even in this embodiment, as in the first embodiment, it is desirable to provide a radiation means by which a heat is easy to diverge into barrel the portion and diaphragm. As one embodiment of the radiation means, in addition to the explanation disclosed in the first embodiment, a radiation plate is attached to the diaphragm 27, and thus the emission of heat caused by the diaphragm 27 is promoted. In this way, the heat generation of the diaphragm 27 and the barrel can be prevented effectively. Deterioration and damage to the diaphragm 27 and the barrel, and deterioration and damage of optical elements and other parts due to the heat propagated from the barrel and the diaphragm 27 can be prevented effectively.

In the above case, wherein the infrared cutting filter is not arranged in the optical path. However, the infrared cutting filter can also be arranged in the optical path. In such a case, as shown in FIG. 19, it is preferable to arrange the infrared cutting filter 21 between the diaphragm 27 and the viewing subject 14. In this way, light components of infrared range transmitting through the diaphragm 27 can be removed slightly along with infrared cutting filter 21, so that the infrared light can be further removed from the illuminating light. Thus, the deterioration and damage due to heating of respective optical elements can be prevented more effectively.

Moreover, in this embodiment, it is desirable for the first diffraction lens 25 to be made by quartz, similar to the first embodiment. As explained in the first embodiment, if the diffraction lens 25 is made of quartz, even if the infrared light less than wavelength about 4 μm is entered into the diffraction lens 25, the most of the infrared light is not absorbed. Instead, it is transmitted, so that the heat generation of diffraction lens 25 is minimal, and thus the deterioration and damage due heating of the diffraction lens 25 can be prevented effectively.

FIG. 20 shows a third embodiment of the illuminating optical system according to the present invention. In this embodiment, the white light containing at least light components in visual range and infrared range from the light source 11 having the reflection mirror **11*a* and the lamp 11*b* is entered into the relief type diffraction lens 25 to obtain a plurality of diffraction order lights by diffraction. The +first order light 26 is incident on the end face at incident side 19 of light guide 18 to transfer in the light guide 18, and the viewing subject on an object point is illuminated by the illuminating light emitted from the end face at an incident side at an opposite side. In the case of observation with the visible light, as the lamp 11*b*, as in the case of the first and second embodiments may be a xenon lamp, a halogen lamp, or a metal halide lamp. Moreover, similar to the second embodiment, the relief type diffraction lens 25**, has a sectional shape of the relief pattern made in a blazed shape.

In this embodiment, the second light entering into diffraction lens 25 is diffracted into a plurality of diffracted order light (as explained in the second embodiment), while the zero order light 28 thereof is propagated straight; and the ±m order light thereof is propagated and is either condensed or diverged. The diffraction angle thereof is different every order of diffraction, and the focus distance is also different. In the present case, the +m order light is imaged on the imaging plane of the +m order light (m=1,2,3, . . . ), and the other order light is not imaged and spread. Accordingly, if the end face at incident side 19 of the light guide 18 is arranged at a position of imaging plane of the +m order light, then the +m order light enters into light guide 18 entirely, and illuminates the viewing subject through the light guide 18. However, only one part of other ordered light enters into the light guide 18, and the major parts thereof are taken out of the optical path.

As explained previously, regarding the depth d of concave portion of the relief pattern of the diffraction lens 25, the larger is the order m of diffraction, the shorter is the wavelength B. Therefore, because the wavelength at which diffraction efficiency becomes 100% is different by the order m of diffraction, the wavelength range can be selected by selecting the order of diffraction. In this case, if diffraction efficiency in visible range is high, the +m order light may be any order light; however, as explained in the second embodiment, it is preferable to use the +first order light as an illuminating light. Moreover, as shown in FIG. 8, the depth d of concave portion is decided in such a manner that the diffraction efficiency of the +first order light 26 is high in visible range, and the diffraction efficiency of the zero order light 28 becomes higher in infrared range.

Moreover, if the end face at incident side 19 of the light guide 18 is arranged at a position of an imaging plane of the +first order light 26 diffracted by the diffraction lens 25, the +first order light 26 containing light components of visible range greatly illuminates the viewing subject through the light guide 18. Therefore, the light components in the infrared range are diffracted as the order light, in particular, the zero order light 28, most of which does not enter into the light guide 18. Accordingly, this light is removed from the illuminating light. Therefore, unnecessary infrared light can be removed effectively without using infrared cutting filter.

Moreover, the relief pattern of the diffraction lens 25 has a blazed sectional shape. As explained previously, the diffraction efficiency for a certain wavelength becomes roughly 100%. Therefore, as shown in FIG. 8, if the diffraction efficiency at a certain wavelength in the visible range also becomes 100%, a brighter illuminating light can be provided than in the case that a diffraction lens of another shape is used. Moreover, since diffraction efficiency in the visible range of the diffraction light except +first order light such as the zero order light, is low, the energy of the visible range emitted from light source 11 is concentrated on the first order light 26 and can be used effectively.

Herein, the diffraction lens 25 must be constructed in such a manner that the numerical aperture near the wavelength 0.7 $\mu$m of the diffraction order light using as the illuminating light; for example the +first order light 26 of the generated diffraction order lights is substantially equal to that of the light guide 18. The numerical aperture (NA) of the light guide 18 is shown in equation (3). Also, when the light is diffracted by the diffraction lens, the longer the wavelength of the light, the larger is the diffraction angle, so that as the wavelength lengthens, the numerical aperture becomes larger.

Therefore, if the numerical aperture of the diffraction lens 25 near the wavelength 0.7 $\mu$m of the +first order light 26 using as the illuminating light is substantially equal to that of the light guide 18, then the light of wavelength shorter than the wavelength 0.7 $\mu$m, the numerical aperture of the diffraction lens 25 becomes smaller than the that of the light guide 18. Thus, all the +first order lights 26 incident on the end face 19 at incident side of the light guide 18 are transmitted through the light guide 18. On the other hand, if the light of the wavelength is longer than 0.7 $\mu$m, the numerical aperture of the diffraction lens 25 becomes larger than that of the light guide 18. In this case, only the lights where the incident angle near the center is smaller than the incident angle A of equation (3), (for example, the +first order light 26 incident on the end face 19 at incident side of the light guide 18), can be transmitted through the light guide. Thus, the quantity of the light transmitted through the light guide 18 is decreased. Moreover, the longer is the wavelength, the larger is the numerical aperture of the diffraction lens 25, so that only a part of the light at the center is transmitted through the light guide. That is, the visual light necessary for an illuminating light is transmitted through the light guide 18 effectively, and the infrared light to be removed does not transmit through the light guide 18.

As for the +first order light 26 using the illuminating light, most of its light components in infrared range are removed by the diffraction lens 25 already, as shown in FIG. 8. The diffraction efficiency of the +first order light 26 does not become 0 except for a specified wavelength, so that there are a few light components in the infrared range. However, if the diffraction lens 25 of the above described numerical aperture is used, only part of light of a wavelength longer than a value near 0.7 $\mu$m can transmit through the light guide 18. The few remaining light components of the infrared range can be removed, so that illuminating light containing very few components in the infrared range can be obtained. Accordingly, the infrared light irradiated to the viewing subject can be decreased further.

If the depth d of concave portion of the relief pattern of the diffraction lens 25 must be made in such a manner that diffraction efficiency of the +first order light 13 become high in the visual range, this depth d is defined as follows, the same as in the second embodiment;

$$d=d_0$$

wherein d0 is depth of concave portion in the case that diffraction efficiencies of the +first order light 26 at wavelength 0.4 $\mu$m and wavelength 0.7 $\mu$m are equal to each other. In this way, as shown in FIG. 11 by curves ② and ②', when the diffraction efficiency of the +first order light 26 is the lowest, at 75% or more in the wavelength range of 0.4 $\mu$m and 0.7 $\mu$m, particularly, a brighter illumination light can be obtained. Moreover, wavelength-dependency of the quantity of light is reduced in the wavelength range of 0.4 $\mu$m to 0.7 $\mu$m, so illumination light having more flat spatial characteristic can be obtained.

Moreover, the depth d of concave portion of relief pattern need not be always d0, if this depth is within following range;

$$0.74\ d_0 \leqq d \leqq 1.43\ d_0$$

which provides enough effect to be obtained for practical use. That is, as described in the second embodiment, if the depth d of concave portion is within the above range, the +first order light is more powerful than the zero order light to be removed; this always holds true in the visible range used for an illuminating light, when its diffraction efficiency is 10% or more. Accordingly, bright illuminating light can be obtained in practical use in a necessary wavelength range by using the +first order light 26.

Even in this embodiment, the diffraction ordered light diffracted by the diffraction lens 25 and taken out of the optical path. In particular, the zero order light 28 contains light many components of infrared range, so that a heat occurs at, for example, the barrel where these diffraction ordered lights are irradiated. Then, as in the same as the first and second embodiments, the radiation means permits easy divergence of the heat caused on this portion. As the radiation means, in addition to the means as explained in the first embodiment, a radiation plate is attached to the periphery portion, into which light of end face at incident side 19 of light guide 18 does not enter; thus, the emission of heat caused in an end face of the light guide 18 may be promoted. In this way, the barrel is prevented from heating and thus, deterioration and damage of the barrel itself, and deterioration and damage of optical element or other parts due to the heat propagated from the barrel, can be prevented effectively.

The above description explains a case in which the infrared cutting filter is not arranged in the optical path. However, the infrared cutting filter can also be arranged in the optical path. In this case, as shown in FIG. 21, it is desirable to arrange the infrared cutting filter 21 at a position near to end face at incident side 19 of the light guide 18, in such a manner that the diffraction order light of high order greater than +second order light is spread greatly between the diffraction lens 25 and the light guide 18. If the infrared cutting filter 21 into which the light except +first order light does not enter, but only +a first order light enters, is arranged, the light components in the infrared range having a wavelength longer than 0.7 μm which entered at an angle smaller than the incident angle A (shown in FIG. 9) can be removed. Thus, the light components in the infrared range contained in the illuminating light can be decreased further.

Also, it is desirable for the first diffraction lens 25 to be made of quartz, the same as in the first embodiment. In this way, if the diffraction lens 25 is made of quartz, as explained in the first and the second embodiments, even if infrared light less than wavelength about 4 μm is enters, such infrared light is not absorbed, but rather is transmitted. Therefore, heating hardly occurs in the diffraction lens 25, and thus deterioration and damage due to heating of diffraction lens 25 can be prevented effectively.

Figure 22:
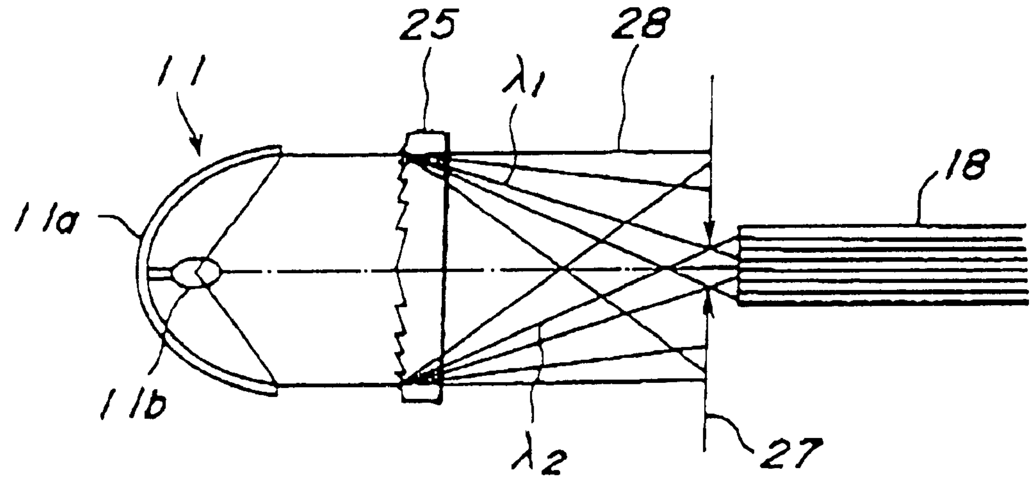
FIG. 22 is a side view showing fourth embodiment of an illumination optical system according to the present invention.

FIG. 22 shows a fourth embodiment of the illuminating optical system according to the present invention. According to this embodiment, in the third embodiment, a diaphragm 27 is arranged in the optical path between the diffraction lens 25 and the light guide 18. First, the light from the light source 11 enters into the relief type diffraction lens 25. In case of observing the viewing subject, in the same manner as in the above embodiments, a lamp 11*b* of light source 11 comprising one of a xenon lamp, a halogen lamp and a metal halide lamp having strong spectrum are preferable. Also, in the same manner as in the second and third embodiments, the diffraction lens 25 has blazed section shape of relief pattern.

The light entered into the diffraction lens 25 is subjected to diffraction and divided into several diffraction order lights, and then the zero order light 28 progresses in a straight direction. Thus, the ±m order lights diffracts, and they are either condensed or diverged. In this case, the diffraction angle is different in every order of diffraction, and the focal length is also different. Accordingly, if the diaphragm 27 is arranged at focus position of the +m order light, only the +m order light is taken out, and other diffraction ordered lights can be removed. In this case, if diffraction efficiency in visible range is high, the +m ordered light may be any ordered light, as explained in the second embodiment, it is preferable to use the +first order light as an illuminating light. Thus, first order light is preferable in the case where the +first order light is used as an illuminating light.

The diaphragm 27 is arranged at a focal position of the +first order light 26, in such a manner that the diaphragm passes only the +first order light 26 having light strength in visible range. In particular, other ordered having light strength in infrared range is shielded. For example, the zero order light 28, is located at a position where the radius of light flux of wavelength $\lambda_1$ and wavelength $\lambda_2$ of the +first order light 26 become almost equal to each other. In this case, the wavelength $\lambda_1$ and wavelength $\lambda_2$ are defined as following ranges;

$$0.35\ \mu m \leqq \lambda_1 \leqq 0.45\ m$$

$$0.65\ \mu m \leqq \lambda_2 \leqq 0.8\ m$$

Therefore, when the light diffracts by the diffraction lens 25, the longer is the wavelength, the the more light is bent. Accordingly, if white light enters into the diffraction lens 25, the longer is the wavelength, the shorter is the distance of the imaging point from the diffraction lens 25, as shown in FIG. 9. If the diaphragm 27, having a radius almost equal to the radius of light flux, is arranged at the position where the radius of light flux of wavelength $\lambda_1$ and wavelength $\lambda_2$ of the +m order light become almost equal to each other. Therefore, the light of the necessary wavelength range $\lambda_1$ to $\lambda_2$ passes through the diaphragm 27 without shading, while the light flux of a shorter wavelength range than wavelength $\lambda_1$, and of longer wavelength range than wavelength $\lambda_2$ is spread. Accordingly, only a part thereof can be transmitted.

Therefore, when the diffraction lens 25 having wavelength-dependency of diffraction efficiency shown in FIG. 8 is used, if the diaphragm 27 is arranged at the position that the radius of light flux of wavelength $\lambda_1$ and wavelength $\lambda_2$ of the +first order light 26 become substantially equal, only the +first order light 26 is transmitted. In addition, only the light components in the necessary wavelength range $\lambda_1$~$\lambda_2$ contained therein is transmitted, and thus the infrared light contained in the +first order light 26 used as an illuminating light can be further removed farther. Accordingly, an illuminating light hardly contains any wavelength component at a value outside of the necessary wavelength range be obtained, and the deterioration and damage of optical elements due to a heat caused by absorption of the infrared light can be prevented more effectively.

Herein, the above wavelength $\lambda_1$ and $\lambda_2$ are preferably defined as following range:

$$0.38\ \mu m \leqq \lambda_1 \leqq 0.42\ \mu m$$

$$0.68\ \mu m \leqq \lambda_2 \leqq 0.72\ \mu m$$

In this way, only the light having wavelength in visible range of about 0.4 μm to 0.7 μm can be transmitted through the diaphragm 27. Herein, as explained in the second embodiment, the wider is the wavelength range $\lambda_1$~$\lambda_2$, the larger that the diaphragm radius of the diaphragm 27 is required. Even in cases where the light is not within this wavelength range, for example, infrared light, the light passed near the optical axis in the diaphragm plane is transmitted through the diaphragm 27. Therefore, the wider the wavelength range $\lambda_1$~$\lambda_2$, the larger is the diaphragm radius, so that the quantity of the infrared light transmitted through the diaphragm 27 can be increased.

On the contrary, if the wavelength range $\lambda_1$~$\lambda_2$ is made narrow, the radius of diaphragm can be small, and thus the quantity of the infrared light transmitted through the diaphragm 27 can also be decreased further. In this case a part of light of a short wavelength range and a long wavelength range are among the light in visible range being shielded by the diaphragm 27; thus, a quantity of light is decreased. However, relative luminous efficiency is greater than about 0.7 μm in the case of foveal vision, and a value thereof is very small. In the case of scotopic vision the value is less than about 0.4 μm and a value thereof is very small. Even if a quantity of light decreases in the range of wavelength 0.4 μm to 0.7 μm, there is practically no influence on visual observation. Therefore, if the light of range of wavelength near 0.7 μm to wavelength near 0.4 μm is transmitted through the diaphragm 27, there is very little infrared light to transmit through diaphragm 27, and the decrease of light components in the visible range can obtain better illuminating light, which is not a problem for practical use.

Moreover, in this embodiment, the infrared light is shielded by the diaphragm 27, so that the heat is generated in the diaphragm 27. On this account, it is preferable to provide radiation plate to the diaphragm 27 as shown in FIG. 16. Also, as explained in the first embodiment to third embodiment, a heat is caused in the barrel or the like, so that the barrel is made of shape with a radiation plate, and the barrel may be subjected to an air-cooling or a water cooling.

In this way, the barrel and the diaphragm 27 can be prevented from becoming heated, and thus deterioration and damage of the barrel and the diaphragm themselves, and deterioration and damage of the optical element or other parts due to the heat propagated from the barrel and the diaphragm 27, can be prevented effectively.

Figure 23:
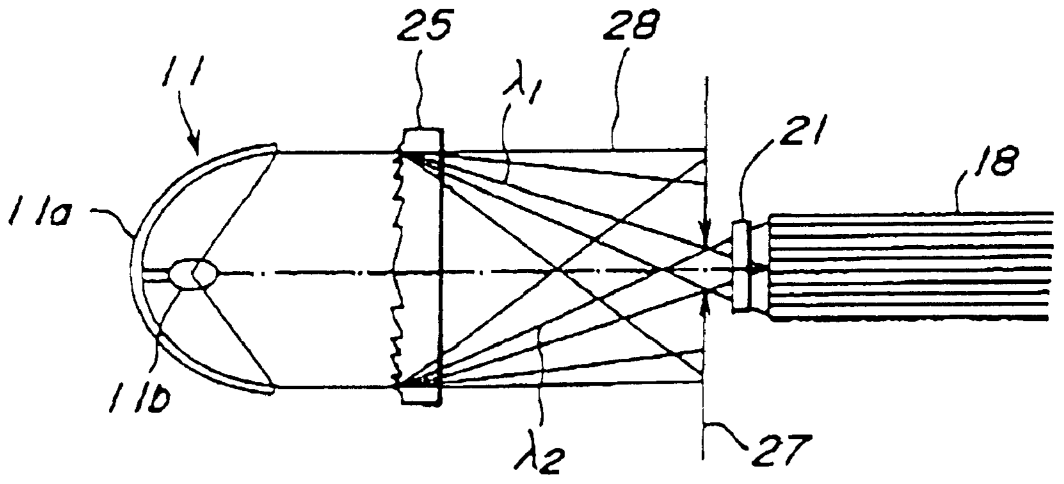
FIG. 23 is a side view showing the construction of the illumination optical system provided with the infrared cutting filter in FIG. 22.

Moreover, in this embodiment, the infrared cutting filter can be arranged in the optical path. In this case, as shown in FIG. 23, it is desirable to arrange the infrared cutting filter 21 between the diaphragm 27 and the light guide 18. In this way, the light components of the infrared range transmitted through the diaphragm 27 can be slightly removed by the infrared cutting filter 21, so that the efficiency is increased. In addition, the infrared light can be removed from the illuminating light, and thus deterioration and damage by a heat of each optic element, can be prevented more effectively.

Also, it is desirable for the first diffraction lens 25 to be made of quartz similar to the disclosure of the first to third embodiments. In this way, if the diffraction lens 25 is made of quartz, even if the infrared light less than wavelength about 4 μm enters, most of this infrared light is not absorbed, but is transmitted. Thus, a heating hardly occurs in the diffraction lens 25, and deterioration and damage due to the heat of diffraction lens 25 can be prevented effectively.

Figure 24:
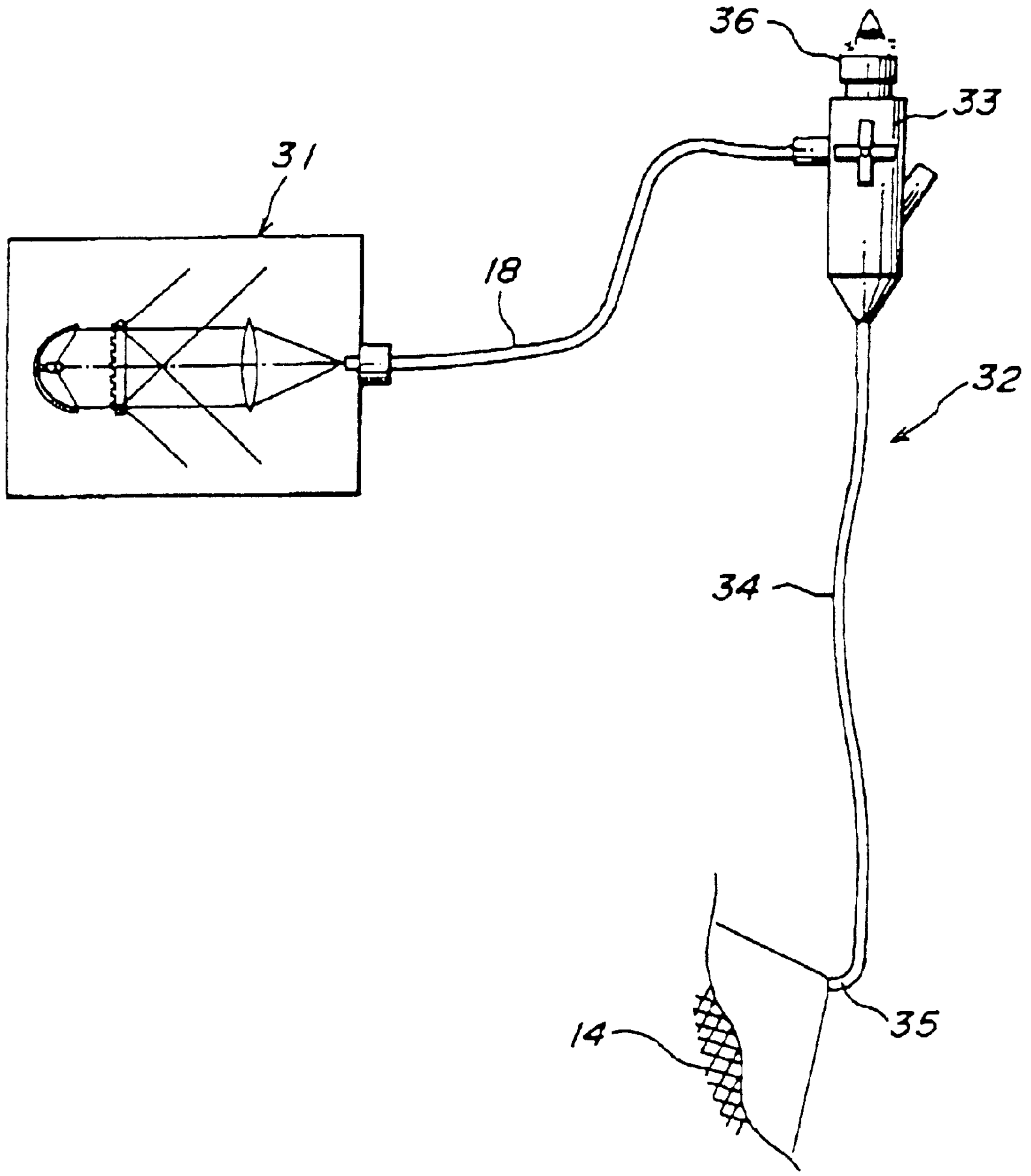
FIG. 24 is an explanatory view showing a construction of one embodiment of an endoscope system applied to the illumination optical system according to the present invention.

FIG. 24 shows a constitution of one example of an endoscope system applying an illuminating optical system according to the present invention. According to this endoscope system, illuminating light from a light source section 31 having the above illuminating optical system according to the present invention is incident on a light guide 18 arranged to extend over an operating section 33, an inserting section 34 and a bending section 35 of an endoscope 32, and the bending section 35 is operated by the operating section 33, thereby illuminating a viewing subject 14 in for example the body cavity. Moreover, in addition to the above light guide 18, the endoscope 32 is provided with an image guide or a tube for insulation and inspiration or the like, and is extended over the operating section 33, the inserting section 34 and the bending section 35. Also, the light reflected on the viewing subject 14 is propagated in an ocular section 36 of the endoscope 32 through an image guide, thereby effecting a visual observation, or an imaging element of CCD is provided with an ocular section 36, and imaged, thereby effecting an observation of a monitor screen.

In the endoscope system shown in FIG. 24, as explained previously, illumination optical system in the light source section 31 diffracts the light from a lamp by the diffraction optical element, the light components in infrared range are taken out of the optical path, and only the light components in the visible range enter into the light guide 18. Therefore, the illuminating light, consisting of mainly light components of visible range, can be obtained. Accordingly, the infrared light can be effectively removed without using the infrared cutting filter of the type such as an infrared absorption filter or an infrared reflection filter. Moreover, even in case of using the infrared cutting filter, heat generated by the filter can be prevented effectively and the deterioration of the filter can be prevented effectively, so that the light source section 31 can be formed inexpensively. In addition, the durability can be increased greatly. Moreover, when the infrared light does not enter into the light guide 18 and other optical elements, they do not generate the heat, thereby further suppressing deterioration and damage due to the heat. Accordingly, the inexpensive and durable endoscope system can be realized as a whole.

What is claimed is:

1. An illumination optical system comprising:

a light source for emitting white light including at least components of visible and infrared ranges; and a relief type diffracting optical element for diffracting light flux of the white light;

the relief type diffracting optical element having a rectangular cross-sectional shape with periodically formed uneven portions, in such a manner that zero order light can be used as illumination light.

2. An illuminating optical system as claimed in claim 1, further comprising a light guide fiber bundle to transmit light flux of the zero order light to an objective point of a subject to be viewed.

3. An illuminating optical system as claimed in claim 2, wherein the relief pattern of the relief type diffraction optical element has a ratio β between a width of a plurality of respective concave portions of said relief pattern and a pitch of adjacent convex portion, where β is in a range of $$0.34 \leqq \beta \leqq 0.66$$

and a groove depth d is:

$$0.85\ d_0 \leqq d \leqq 1.09\ d_0$$

wherein $d_0$ is a depth of a concave portion in a case of zero order light having equal diffraction efficiencies at wavelengths in a range of 0.4 μm and 0.7 μm.

4. An illuminating optical system as claimed in claim 3, wherein the ratio β is;

$$0.45 \leqq \beta \leqq 0.55$$

and the groove depth d is;

$$0.96\ d_0 \leqq d \leqq 1.02\ d_0.$$

5. An illuminating optical system as claimed in claim 1, wherein the diffraction optical element and diffraction lens are made of quartz.

6. An illuminating optical source having an illuminating optical system as claimed in claim 1.

7. An illuminating optical system comprising:

a light source for emitting white light including at least components of visible and infrared ranges; and a relief type diffraction optical element having a grating with a rectangular sectional shape having an equal area of a pattern of lands and grooves therein, so that zero order light can be used as illumination light among diffracted light emitted from said relief type diffraction optical element wherein the relief pattern of the relief type diffraction optical element has a ratio β between a width of a plurality of respective concave portions of said relief pattern and a pitch of an adjacent convex portion, where β is in a range of:

$$0.34 \leqq \beta \leqq 0.66$$

and a groove depth d is:

$$0.85\ d_0 \leqq d \leqq 1.09\ d_0$$

where $d_0$ is a depth of a concave portion in a case of zero order light having equal diffraction efficiencies at wavelengths in a range of 0.4 μm and 0.7 μm.

8. An illuminating optical system as claimed in claim 7, wherein the ratio β is;

$$0.45 \leqq \beta \leqq 0.55$$

and the groove depth d is;

$$0.96\ d_0 \leqq d \leqq 1.02\ d_0.$$

9. An illumination optical system comprising:

a light source for emitting white light including at least a component of visible and infrared ranges;

a relief type diffracting lens for diffracting light flux of the white light; and a diaphragm arranged at an image point side of the diffracting lens;

the diffracting lens having a section shape of a blazed grating form with a periodically formed saw-tooth pattern;

the diaphragm being arranged at a position of a direction of a light axis so that a radius of light flux of wavelength $\lambda_1$ and wavelength $\lambda_2$ of diffracted order light of the diffracting lens, which is used as an illumination light, becomes almost equal to each other, and the diaphragm has a radius almost equal to the radius of the light flux, wherein the wavelength $\lambda_1$ and the wavelength $\lambda_2$ are wavelengths in the following ranges, respectively:

$$0.35\ \mu m \leqq \lambda_1 \leqq 0.45\ \mu m$$

$$0.65\ \mu m \leqq \lambda_2 \leqq 0.8\ \mu m.$$

10. An illuminating optical system comprising:

a light source for emitting white light including at least a component of visible and infrared ranges;

a relief type diffracting lens for diffract light flux of the white light; and a diaphragm arranged at an image point side of the diffracting lens;

the diffracting lens having a section shape of a blazed grating form;

the diaphragm being arranged at a position of a direction of a light axis so that a radius of light flux of wavelength $\lambda_1$ and wavelength $\lambda_2$ of diffracted order light of the diffracting lens, which is used as an illumination light, becomes almost equal to each other, and the diaphragm has a radius almost equal to the radius of the light flux, wherein the wavelength $\lambda_1$ and the wavelength $\lambda_2$ have wavelengths in the following ranges, respectively:

$$0.38\ \mu m \leqq \lambda_1 \leqq 0.42\ \mu m$$

$$0.68\ \mu m \leqq \lambda_2 \leqq 0.72\ \mu m.$$

11. An illuminating optical system as claimed in claim 10, wherein the depth d of the concave portion of relief pattern of the relief type diffraction lens is defined as following range:

$$0.74\ d_0 \leqq d \leqq 1.43\ d_0$$

wherein $d_0$ is depth of concave portion in the case of diffraction efficiencies of +first ordered light being equal the each other at wavelengths 0.4 $\mu$m and 0.7 $\mu$m.

12. An illumination optical system comprising:

a light source for emitting white light including at least a component of visible and infrared ranges;

a light guide fiber bundle to transmit light flux of the white light to an objective point of a subject to be viewed;

the system having a sectional shape which is a relief type diffracting lens in a blazed grating form with a periodically formed saw-tooth pattern which is arranged in a light path between the light source and an end face of the light guide at its incident side.

13. An illuminating optical system as claimed in claim 12, wherein a numerical aperture at a wavelength $\lambda_3$ of a certain diffraction order of the diffraction order light generated in the relief type diffraction lens is equal to that of the light guide fiber bundle, wherein the wavelength $\lambda_3$ is defined in the following range:

$$0.68\ \mu m \leqq \lambda_3 \leqq 0.72\ \mu m.$$

14. An illuminating optical system as claimed in claim 13, wherein the depth d of the concave portion of relief pattern of the relief type diffraction lens is defined as following range;

$$0.74\ d_0 \leqq d \leqq 1.43\ d_0$$

wherein $d_0$ is depth of concave portion in the case of diffraction efficiencies of +first ordered light being equal to each other at wavelengths 0.4 $\mu$m and 0.7 $\mu$m.

15. An illuminating optical system comprising:

a light source for emitting white light including at least a component of visible and infrared ranges;

a light guide to transmit light flux of the white light to an objective point of a subject to be viewed;

the system having a sectional shape which is a relief type diffracting lens in a blazed grating form which is arranged in a light path between the light source and an end face of the light guide at its incident side;

wherein a diaphragm having a radius equal to that of the light flux is arranged at a position in which an optical flux radius of wavelengths $\lambda_1$ and $\lambda_2$ of the diffraction ordered light utilized as an illuminating light are equal to each other on the optical axis between the relief type diffraction lens and the end face at the incident side of the light guide, wherein the wavelengths $\lambda_1$ and $\lambda_2$ are within the following ranges:

$$0.35\ \mu m \leqq \lambda_1 \leqq 0.45\ \mu m$$

$$0.65\ \mu m \leqq \lambda_2 \leqq 0.8\ \mu m.$$

16. An illuminating optical system as claimed in claim 15, wherein the depth d of the concave portion of relief pattern of the relief type diffraction lens is defined as following range;

$$0.74\ d_0 \leqq d \leqq 1.43\ d_0$$

wherein $d_0$ is depth of concave portion in the case of diffraction efficiencies of +first ordered light being equal the each other at wavelengths 0.4 $\mu$m and 0.7 $\mu$m.

17. An illuminating optical system as claimed in claim 15, wherein the above wavelengths $\lambda_1$ and $\lambda_2$ are made as following ranges;

$$0.38\ \mu m \leqq \lambda_1 \leqq 0.42\ \mu m$$

$$0.68\ \mu m \leqq \lambda_2 \leqq 0.72\ \mu m.$$

18. An illuminating optical system as claimed in claim 17, wherein the depth d of the concave portion of relief pattern of the relief type diffraction lens is defined as following range;

$$0.74\ d_0 \leqq d \leqq 1.43\ d_0$$

wherein $d_0$ is depth of concave portion in the case of diffraction efficiencies of +first ordered light being equal the each other at wavelengths 0.4 $\mu$m and 0.7 $\mu$m.

19. An illuminating optical system comprising:

a light source for emitting white light including at least a component of visible and infrared ranges;

a relief type diffracting lens for diffracting light flux of the white light; and a diaphragm arranged at an image point side of the diffracting lens;

the diffracting lens having a section shape of a blazed grating form;

the diaphragm being arranged at a position of a direction of a light axis so that a radius of light flux of wavelength $\lambda_1$ and wavelength $\lambda_2$ of diffracted order light of the diffracting lens, which is used as an illumination light, becomes almost equal to each other, and the diaphragm has a radius almost equal to the radius of light flux, wherein the depth d of the concave portion of relief pattern of the relief type diffraction lens is within the following range;

$$0.74\ d_0 \leqq d \leqq 1.43\ d_0$$

wherein $d_0$ is the depth of a concave portion in the case of diffraction efficiencies of +first ordered light being the equal of each other at wavelengths of 0.4 μm and 0.7 μm.

20. An illuminating optical system comprising:

a light source for emitting white light including at least a component of visible and infrared ranges;

a light guide to transmit light flux of the white light to an objective point of a subject to be viewed;

the system having a sectional shape which is a relief type diffracting lens in a blazed grating form which is arranged in a light path between the light source and an end face of the light guide at its incident side, wherein the depth d of the a concave portion of relief pattern of the relief type diffraction lens is within the following range;

$$0.74\ d_0 \leqq d \leqq 1.43\ d_0$$

wherein $d_0$ is a depth of concave portion in the case of diffraction efficiencies of +first ordered light being equal to each other at wavelengths 0.4 μm and 0.7 μm.

21. An illuminating optical system comprising:

a light source for emitting white light including at least a component of visible and infrared ranges;

a diffraction optical element comprising a relief type diffracting lens for diffracting light flux of the white light; and a diaphragm arranged at an image point side of the diffracting lens;

the diffracting lens having a section shape of a blazed rating form with a periodically formed saw-tooth pattern;

the diaphragm being arranged at a position of a direction of a light axis so that a radius of light flux of wavelength $\lambda_1$ and wavelength $\lambda_2$ of diffracted order light of the diffracting lens, which is used as an illumination light, becomes almost equal to each other, and the diaphragm has a radius almost equal to the radius of light flux, wherein the diffraction optical element and diffracting lens are made of quartz.

22. An illumination optical system comprising:

a light source for emitting white light including at least a component of visible and infrared ranges;

a light guide fiber bundle to transmit light flux of the white light to an objective point of a subject to be viewed;

a diffraction optical element comprising a relief type diffracting lens having a sectional shape in a blazed grating form with a periodically formed saw-tooth pattern which is arranged in a light path between the light source and an end face of the light guide at its incident side, wherein the diffraction optical element and diffracting lens are made of quartz.

* * * * *